US012585044B2

(12) United States Patent
Brongersma et al.

(10) Patent No.: US 12,585,044 B2
(45) Date of Patent: Mar. 24, 2026

(54) GEOMETRIC-PHASE METASURFACE OPTOFLUIDICS FOR DYNAMIC ON-DEMAND FLAT OPTICS AND ULTRA-COMPACT REFRACTOMETERS

(71) Applicant: The Board of Trustees of the Leland Stanford Junior University, Stanford, CA (US)

(72) Inventors: Mark L. Brongersma, Menlo Park, CA (US); Qitong Li, Stanford, CA (US); Jorik van de Groep, Harderwijk (NL); Jung-Hwan Song, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 148 days.

(21) Appl. No.: 18/702,992

(22) PCT Filed: Oct. 25, 2022

(86) PCT No.: PCT/US2022/047711
§ 371 (c)(1),
(2) Date: Apr. 19, 2024

(87) PCT Pub. No.: WO2023/214995
PCT Pub. Date: Nov. 9, 2023

(65) Prior Publication Data
US 2025/0271594 A1     Aug. 28, 2025

Related U.S. Application Data

(60) Provisional application No. 63/271,350, filed on Oct. 25, 2021, provisional application No. 63/271,343, (Continued)

(51) Int. Cl.
*G02B 1/00*     (2006.01)
*G02B 26/00*     (2006.01)

(52) U.S. Cl.
CPC ........... *G02B 1/002* (2013.01); *G02B 26/005* (2013.01); *G02B 2207/101* (2013.01)

(58) Field of Classification Search
CPC .................. G02B 1/002; G02B 26/005; G02B 2207/101; G02F 1/29
See application file for complete search history.

(56) References Cited

U.S. PATENT DOCUMENTS 10,890,823 B1 *  1/2021  Jiang ................... G02B 27/0172
11,487,184 B1 *  11/2022  Akselrod ............... G02F 1/292
(Continued)

FOREIGN PATENT DOCUMENTS

WO      WO2023214995      11/2023

OTHER PUBLICATIONS

Yang et al., "Dynamic Bifunctional Metasurfaces for Holography and Color Display", 2021, Adv. Mater. 33, 2101258.
(Continued)

*Primary Examiner* — Jonathan M Hansen
(74) *Attorney, Agent, or Firm* — LUMEN PATENT FIRM

(57) ABSTRACT

This work relates to a geometric-phase metasurface combined with a fluidic circuit for tuning the properties of the metasurface (especially its diffraction efficiency). We consider two aspects of particular interest: A) Dynamic on-demand diffractive optics (operating in transmission), both as optical elements for altering incident light, and as sensors of the refractive index of a fluid; and B) Transparent, reflective displays. Here the display itself is transmissive, but operates in reflection. One application of dynamic on-demand diffractive optics is to replace the lens array often needed in light field displays.

13 Claims, 16 Drawing Sheets

Related U.S. Application Data filed on Oct. 25, 2021, provisional application No. 63/271,354, filed on Oct. 25, 2021.

(56) References Cited

U.S. PATENT DOCUMENTS

| | | | |
|---|---|---|---|
| 11,977,313 B2 * | 5/2024 | Akselrod | G02F 1/292 |
| 2011/0250464 A1 * | 10/2011 | Wilson | B22F 1/0553 |
| | | | 428/570 |
| 2017/0153528 A1 * | 6/2017 | Kim | G02F 1/133602 |
| 2021/0132255 A1 * | 5/2021 | Barton, III | G02B 1/002 |
| 2023/0103982 A1 * | 4/2023 | Song | G02B 6/1221 |
| | | | 359/356 |
| 2024/0411052 A1 * | 12/2024 | Brongersma | G02B 1/002 |
| 2025/0067732 A1 * | 2/2025 | Zhao | G01N 33/5436 |

OTHER PUBLICATIONS

Sun et al., "Real-Time Tunable Colors from Microfluidic Reconfigurable All-Dielectric Metasurfaces", 2018, ACS Nano 12, 2151-2159.

Jahani et al., "Imaging-based spectrometer-less optoluidic biosensors based on dielectric metasurfaces for detecting extracellular vesicles", 2021, Nature Communications 12:3246.

Liu et al., "Switchable All-Dielectric Metasurfaces for Full-Color Reflective Display", 2019, Adv. Optical Mater. v7, 1801639.

* cited by examiner metasurface SEM images
Reflectivity control (top view)
102
n = 1           n = 1.7
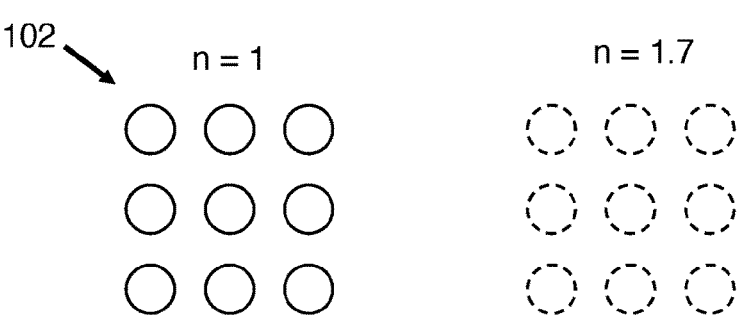
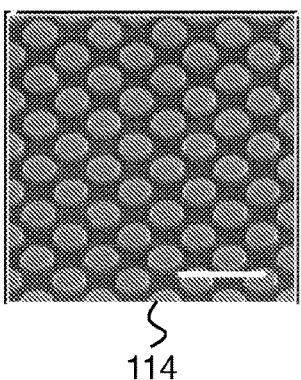
114
Color control (top view)
104
n = 1           n = 1.7
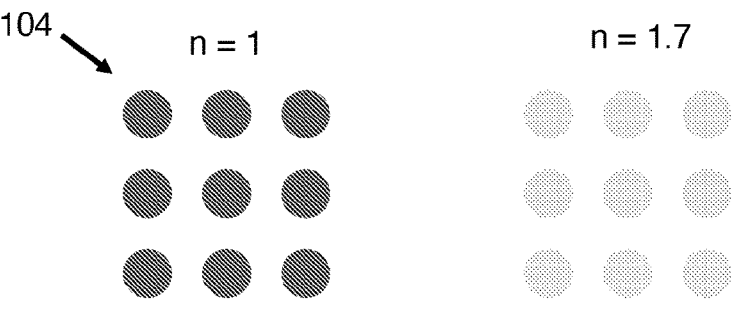
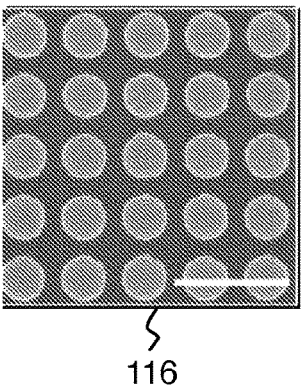
116
Diffraction efficiency control (side view)
106
n = 1           n = 1.7
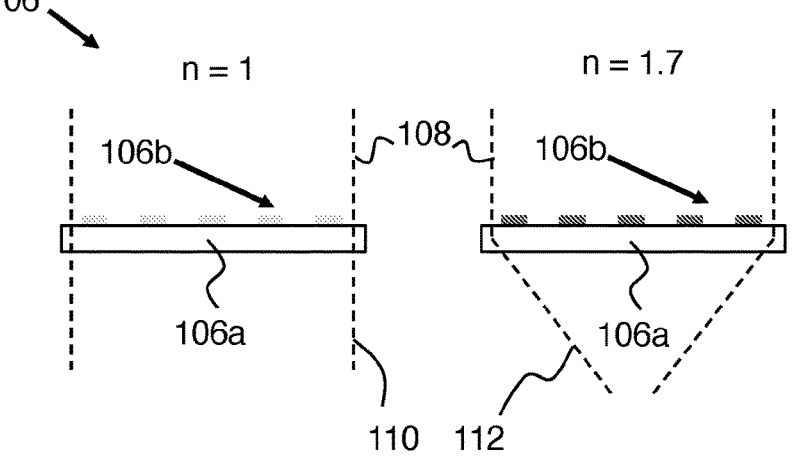
106b     108     106b
106a          106a
110   112
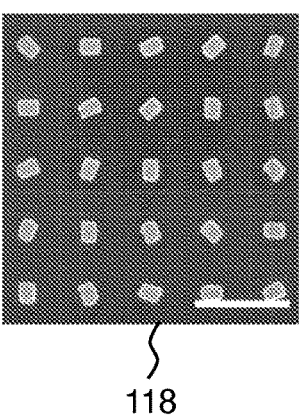
118
FIG. 1A Pixels     Pattern printing 302
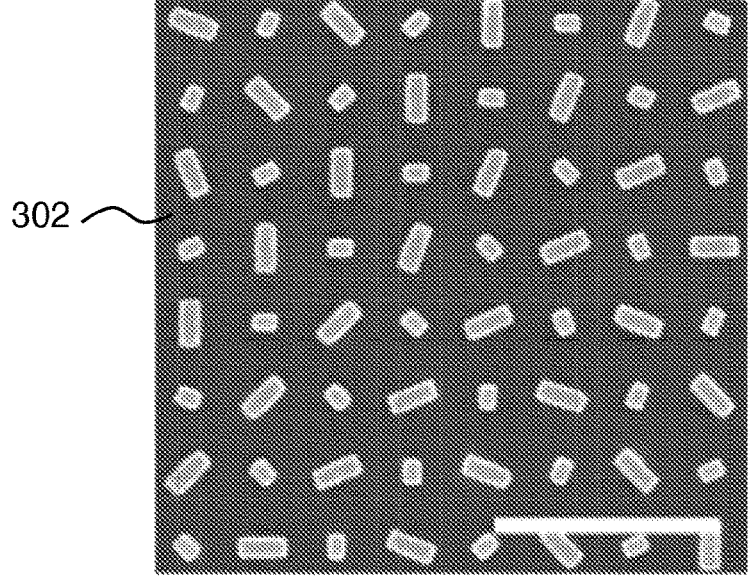
n = 1
n = 1.7
304    306    304    304    306    304
302    302
314    316
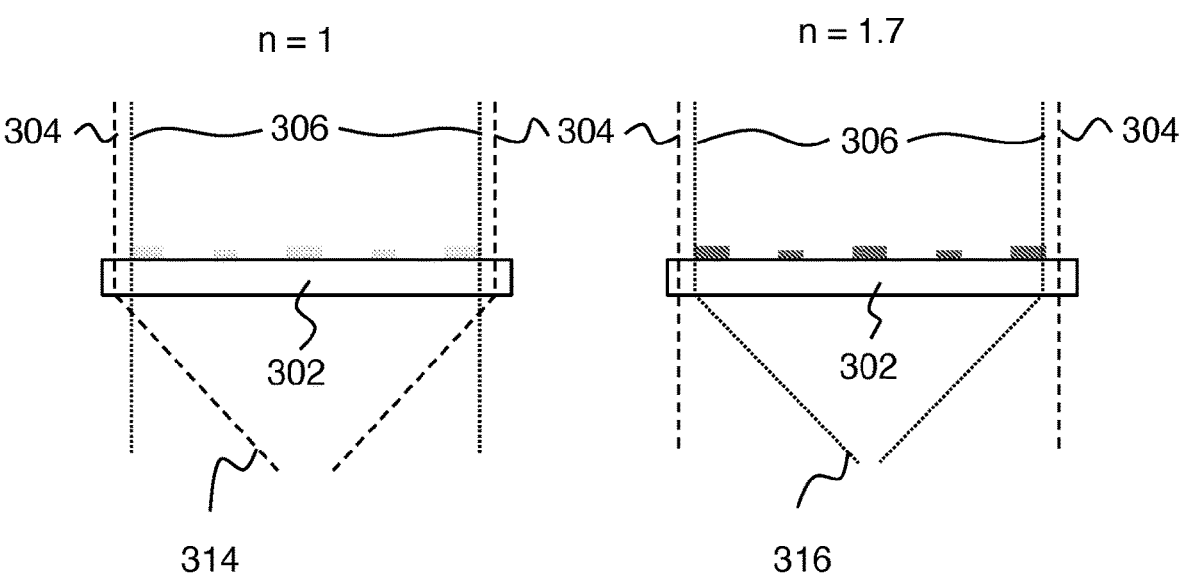
FIG. 3C

410

Turn on

Turn off conventional
lens array 604 tunable diffractive
optical element 606 planar light field
display elements 602 planar light field
display elements 602

702          706

Set ambient
index of refraction

Tune metasurface
optical properties
(diffraction efficiency)

Measure metasurface
optical properties
(diffraction efficiency)

Sense ambient
index of refraction

704          FIG. 7B

GEOMETRIC-PHASE METASURFACE OPTOFLUIDICS FOR DYNAMIC ON-DEMAND FLAT OPTICS AND ULTRA-COMPACT REFRACTOMETERS

CROSS-REFERENCE TO RELATED APPLICATIONS

This application is a 371 of PCT application PCT/US2022/047711 filed Oct. 25, 2022. PCT application PCT/US2022/047711 claims the benefit of U.S. Provisional application 63/271,350 filed Oct. 25, 2021. PCT application PCT/US2022/047711 claims the benefit of U.S. Provisional application 63/271,343 filed Oct. 25, 2021. PCT application PCT/US2022/047711 claims the benefit of U.S. Provisional application 63/271,354 filed Oct. 25, 2021.

FIELD OF THE INVENTION

This invention relates to fluidic control of metasurface optical properties for devices operating in transmission.

BACKGROUND

There are many ways to alter the optical properties of incident light to create a useful optical device. One such way is the use of metasurfaces, which are planar structures having subwavelength nanostructures modulating the amplitude, phase and/or polarization of incident light. It is frequently desirable to make an optical device tunable, such that its effect on incident light can be altered by one or more control inputs.

However, it is relatively difficult to make optical metasurfaces tunable, since they tend to be fabricated in materials like silicon which have optical properties that are difficult (or impossible) to change with external inputs.

One way around this difficulty that has been the subject of some preliminary investigations is immersing an optical metasurface in a fluidic system where altering the refractive index of the fluid can alter the optical properties of the metasurface, thereby making it tunable.

However, work to date on these ideas has suffered from various disadvantages. One example of such a disadvantage is a requirement (in some reported cases) for operation only in reflection because of an opaque substrate.

Accordingly, it would be an advance in the art to provide improved fluidically controlled optical metasurfaces.

SUMMARY

In its most basic form, our approach is the convergence of a geometric-phase metasurface with a fluidic circuit. Here a "metasurface" is defined as a flat optical element including a dense (i.e., sub-wavelength) nanostructure array that can be used to control the amplitude, phase, polarization, and spectral shape of an incident light field with sub-wavelength resolution. A "resonant metasurface" is a metasurface where the nanostructure array is a nanoresonator array. These silicon (or any other high-index dielectric/semiconductor materials) nanoresonators support a series of Mie-type optical resonances that can efficiently scatter light at their resonant frequencies which are sensitive to its dielectric environment.

The fluidic circuits can be easily realized in either a conventional microfluidic system or a more compact microfluidic electrowetting system. Both of them are mature technologies in industry that can be made by planar photolithographic microfabrication. Video-speed switching is achievable in both designs. Any material system can be used for the metasurface.

We consider two aspects of particular interest.

A) Dynamic on-demand diffractive optics (operating in transmission), both as optical elements for altering incident light, and as sensors of the refractive index of a fluid. One particularly interesting application of this idea is to planar light-field displays, as described in section VIII-2-(3) below.

B) A transparent, reflective display. Here the display itself is transmissive, but operates in reflection. This combination of properties is particularly attractive for virtual reality applications, where it is often desired to superpose the image provided by the display on a user natural view of a scene. Here the user sees the scene in transmission through the display, and the image provided by the display is provided in reflection to the user.

A) Dynamic On-Demand Optics

This aspect can provide an integrated dynamic flat-optics system, which is realized in a microfluidic system by flowing liquids (air) with different refractive indices on top of an optical phased array including a subwavelength-thick, engineered silicon nanoresonator array integrated on a transparent substrate. This technology enables the dynamic intensity and spectral control of the diffraction efficiency for any arbitrarily designed transmissive optical elements and phased arrays at visible frequencies. Therefore, either conventional optical elements, such as lenses, prisms, and gratings, or complex phased arrays, such as structured light generators and holograms, can be made in an ultra-compact, flat fashion and be turned on and off as needed. Conversely, the diffraction efficiency of optical elements can be used as a sensor to monitor the refractive index change of the liquids flowing on top of it.

Dynamic on-demand flat optics is realized by utilizing diffractive effects, where optical elements can be made to appear and disappear. This requires efficient control over the diffraction efficiency of phased-array optics.

To illustrate the concept, we design a geometric phase metasurface composed of rotated rectangular silicon nanoblocks that encodes a local geometric phase profile with sub-wavelength resolution. This creates an engineered wave front that generates a desired light-field distribution. These metasurfaces can be designed to encode various functions, such as high-NA beam focusing, holography, and large-angle beam steering.

Conversely, the diffraction efficiency of optical elements, for example, the focal point intensity of a lens, can be used as a sensor to monitor the refractive index change of the liquids flowing on top of it. The meta-lens magnifies the refractive index variation by ~10 times. If we assume that a detector can recognize 0.1% light intensity difference (this requires a dynamic range above 10, which is achievable by todays commercial CMOS sensors), the minimum detectable refractive index variation is ~0.01% or ~0.0001 RI. Such a high sensitivity should pave the way towards a wide range of chemical and bio-sensing applications.

This approach provides a unique way to realize arbitrarily designed transmissive optical elements and phased arrays, which can be made to appear and disappear with a smooth efficiency tuning. Compared with existing techniques such as liquid-crystal based spatial light modulators and digital micromirror devices (pixel size typically >5 $\mu$m), the metasurface provides the unprecedented sub-wavelength spatial resolution, which is critical in achieving large-angle beam steering and complex light-field generation that contains high spatial-frequency information.

An ultra-compact refractometer for chemical and biological sensing is another useful application enabled by this invention. In existing technologies, refractive index sensing relies on the change of the critical angle for total internal reflection or the spectral shift of optical resonances induced by the change of the surrounding refractive index. This working principle requires bulk optics such as prisms or gratings to code the refractive index information to the angular distribution of an optical beam, and a high-spatial resolution CCD camera as a terminal for signal collection. This increases the cost of the system, and limits the miniaturization of the system.

In sharp contrast, our dynamic meta-lens facilitates the detection process by transforming the refractive index information directly to the intensity of a bright focal spot. Therefore, either a high-resolution CCD camera or bulk optics such as prisms and gratings are not necessary anymore. This approach may lead to the realization of genuine micro-refractometers that enable new opportunities in medical diagnosis and treatment.

B) Transmissive Reflective Displays

This aspect can provide a new type of reflective display technology in which the tunable pixel is realized in a microfluidic system by flowing transparent liquids (air) with different refractive indices on top of a subwavelength-thick, engineered silicon nanoresonator array on transparent substrate. This technology allows the dynamic broadband reflectivity (brightness) tuning as well as wide-range color tuning of arbitrarily-shaped display pixels with sub-micrometer resolution without the use of inks/pigments, polarizers, color filters, backlight, or back reflectors.

For the metasurfaces used for dynamic reflectivity and color tuning, we optimize the geometry of the nanodisc resonator array to support two dominant optical resonances in the visible spectral range. They feature a symmetric and anti-symmetric phase symmetry with respect to the metasurface plane, respectively. With changes in the refractive index of the surrounding medium by flowing different types of liquids over the metasurface, the two resonances exhibit notably different spectral shifts and changes in optical quality factor. This is attributed to the differences in the modal confinement to the nanodiscs as well as the optical coupling between discs. The latter is modified by dielectric screening when the environmental index is altered. As a result, we can achieve broad tuning of the relative spectral positions and bandwidths of the two dominant optical resonances. This implies that at a fixed wavelength, the amplitude and phases of the scattered fields can greatly vary which can be used to manipulate the reflection, transmission, and absorption properties. We can achieve low reflectivities when strong symmetric and anti-symmetric resonances spectrally overlap, while high reflectivities are expected when these resonances are spectrally displaced such that a large (near-$\pi$) phase shift is obtained between the two resonances.

This work provides a reflective-type display. Therefore, compared with liquid crystal displays (LCDs) and organic light-emitting diode (OLED) displays, it is superior in terms of the readability by mimicking printed papers, and does not consume power in displaying colors. Its excellent readability is most obvious in bright daylight where liquid crystal displays (LCDs) and Organic light-emitting diode (OLED) displays exhibit unwanted glare and the use of polarizers and color filters limit brightness.

There are several existing technologies that have been developed to implement the concept of reflective displays on the market currently, including electrophoretic displays (E-ink, CLEARink), electrowetting displays (Liquavista), and interferometric-modulation (IMOD) displays (Qualcomm).

However, the use of inks/pigments (electrophoretic and electrowetting displays) prevents long term durability and their functionality is severely constrained to a basic light absorption function. IMOD displays do create structural colors, but the broadband Fabry-Perot resonance limits the saturation of colors. It is also challenging to manipulate the shape of inks/moving mirrors down to sub-micrometer resolution, and an opaque back reflector is always necessary in all of these technologies to enhance reflectivity and/or hide idle inks underneath, preventing the realization of transparent displays.

In sharp contrast, our approach generates robust, vivid structural colors from highly designable optical resonances supported by silicon nanoresonators. Arbitrarily-shaped pixels down to sub-micrometer resolution can be patterned by monolithic nanofabrication technologies. The strong reflection originates from the back scattering of nanoresonators, so there is no need to place a back reflector in the system. Given the fact that all the control liquids are also transparent, this approach facilitates the realization of transparent displays, which allow users to receive visual information from the external world through the display at the same time.

BRIEF DESCRIPTION OF THE DRAWINGS

FIG. 1A schematically shows three different functions that can be provided by fluidically tunable metasurfaces.

FIG. 3C shows an example of a metasurface lens that can be tuned to focus either red light or green light by changing the ambient index of refraction.

FIGS. 7A-B schematically show how an index-tunable optical element can also be used as a refractive index sensor.

DETAILED DESCRIPTION

I) Introduction

Figure 1B:
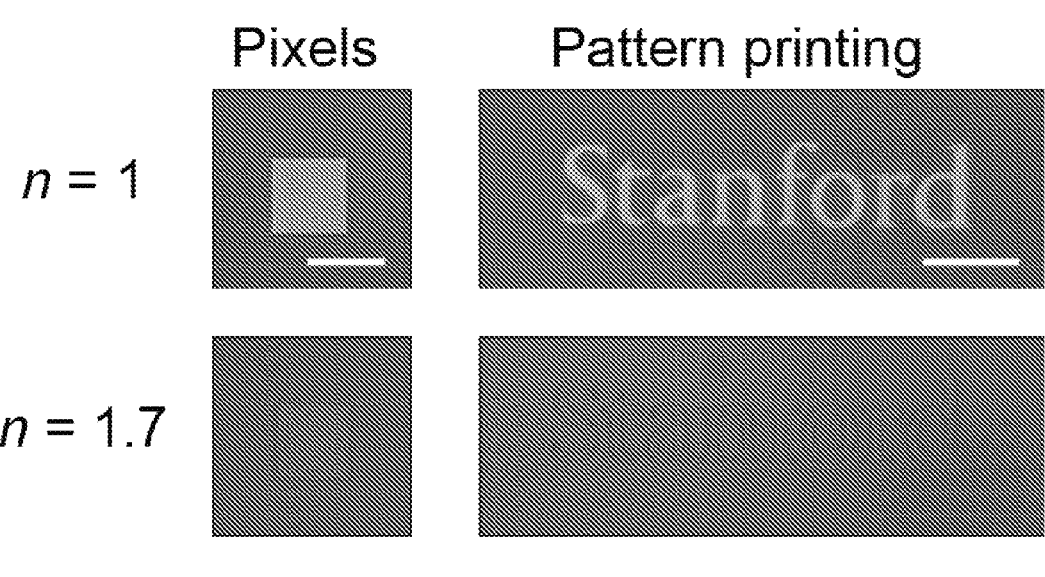
FIGS. 1B-C show results pertaining to reflectivity control.

Microfluidics facilitates highly-automated direction, mixing and manipulation of minute volumes of liquid and has been instrumental in advancing a wide variety of technologies that range from culturing cells and high-throughput diagnostics in biology to micro-reactors for synthetic chemistry. The tremendous synergy derived from integrating optics and fluidics on a single chip has further expanded possibilities as liquids can be used to control local optical properties, and conversely light can also be used to monitor chemical and biological processes inside liquids. Initial attempts have been made to extend this integration to metasurface-based flat optics in GHz and THz regimes. Here, we apply different materials and a conceptionally new mechanism to move this integration to the very important visible spectral range and provide new optical functions that can be transformative in the development of novel displays, dynamic on-demand flat-optics, and sensing technologies.

Displays are omnipresent in our daily lives as they are used in our smartphones, tablets, computer screens, televisions, and data projectors. Advances in display technology may ultimately enable us to turn our entire environment, clothing, and belongings into displays to personalize our life and to satisfy our ever-increasing need for information. Organic light-emitting diode (OLED) and liquid crystal displays (LCDs) currently dominate the display market. Such displays provide vivid images, but when compared to regular ink on paper there are also some important shortcomings. Paper is low cost, superior in terms of readability, and does not actively consume power to display colors. Its excellent readability is most obvious in bright daylight where LCD and OLED displays exhibit unwanted glare, and the use of polarizers and color filters limits the display's brightness. Pioneering realizations of electronic-paper displays employed the physics of electrophoresis and electrowetting in a microfluidic architecture to reversibly cover back reflectors with colored inks, leading to widespread use of electronic-paper displays that mimic the appearance of printed papers and magazines. These displays operate at impressively low power and achieve video-speeds. However, the use of inks prevents long term durability and their functionality is severely constrained to a basic light absorption function. It also remains challenging to manipulate the dimensions of ink display pixels down to sub-micrometer resolution. Additionally, an opaque back reflector is needed to enhance reflectivity and hide idle ink underneath, hindering the realization of transparent displays. Here, we illustrate why metasurfaces comprised of dense arrays of strongly scattering nanostructures could become the new "ink" by solving a number of outstanding challenges that have plagued ink-displays. We demonstrate subwavelength-resolution pixels that offer bright structural colors and long-term stability and present new ways to dynamically control the light field. These features can enable the realization of transparent displays and dynamic on-demand flat-optics, and bring new sensing modalities. The recent demonstration that metasurfaces can increase the brightness and pixel density of OLED displays highlights their potential commercial use.

Given the virtually immutable optical properties of metals and semiconductors it has been challenging to create dynamically-tunable metasurfaces. However, the sensitivity of the optical properties of nanostructures to their dielectric environment can be harnessed instead to tune their scattering behavior and color. Optical metasurfaces have an open structure with many voids and crevasses between the scattering nanostructures that allow easy infiltration with liquids. This made it possible to create tunable metasurfaces using mature liquid crystal technology. Here, we demonstrate a meta-optofluidic platform on a transparent substrate capable of dynamic intensity and spectral control of light-fields without the need for polarizers or color filters.

II) Development of a Dynamic Metasurface Optofluidic Platform

FIG. 1A visualizes several important dynamic control functions that can be achieved by incorporating silicon (Si) metasurfaces inside a microfluidic channel. The nanostructures are designed to alter their scattering properties in real-time by flowing liquids over them with different refractive index (n=1.0 to 1.7).

More specifically, FIG. 1A schematically shows three capabilities provided by the comprehensive dynamic metasurface optofluidic platform of this work. The first capability is reflectivity control, where the reflectivity at a specified wavelength (or wavelength range) is altered. Schematically, metasurface 102 can have larger reflectivity at the design wavelength(s) at n=1 (solid lines) than at n=1.7 (dashed lines). An exemplary corresponding metasurface is shown in SEM image 114. The second capability is color control. Schematically, metasurface 104 can have a different color at n=1 (dark shading) than at n=1.7 (light shading). An exemplary corresponding metasurface is shown in SEM image 116. The third capability is diffraction efficiency control. Schematically, metasurface 106 can have a lower diffraction efficiency at n=1 (incident light 108 is not focused, so output light 110 is unchanged relative to incident light 108) than at n=1.7 (incident light 108 is focused to provide focused light 112). An exemplary corresponding metasurface is shown in SEM image 118. In all cases, integrated microfluidics provide on-demand control over the refractive index (n=1-1.7) of the environment of the nanoresonators in a metasurface by flowing liquids with different refractive index in real time. The scale bar is 500 nm for SEM images 114, 116, and 118.

The side view of the bottom part of FIG. 1A is a convenient place to show that the metasurface-based optical elements of this work include a transparent substrate 106*a* on which the metasurface features 106*b* are disposed. It is often convenient to refer to a metasurface+substrate assembly in this description as a "metasurface", since a transparent substrate is included in all cases. As indicated above, a transparent substrate provides substantial advantages.

Figure 1C:
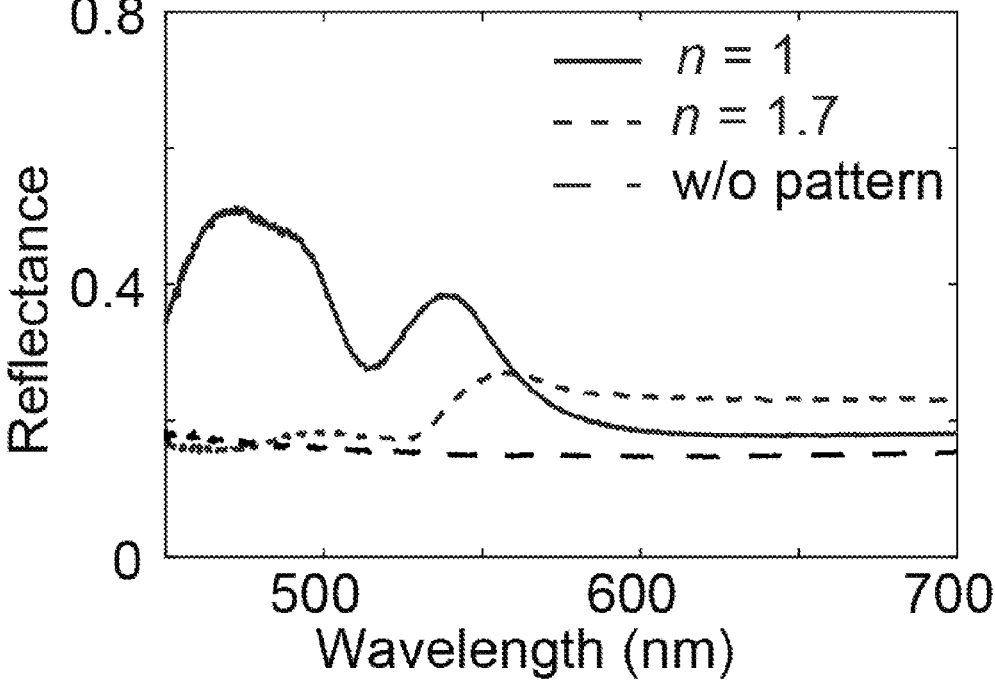

First, we experimentally demonstrate dynamic reflectivity tuning of color pixels 102. FIGS. 1B-C show these results, where FIG. 1B shows reflection optical images and FIG. 1C shows measured reflection spectra of the metasurfaces. The metasurface parameters for this example are height h=75 nm, diameter D=165 nm, and period p=250 nm. A 530 nm short-pass color filter is inserted to enhance the contrast in FIG. 1B. The scale bar on FIG. 1B is 25 μm.

We employ a square lattice of Si nanodisks to ensure a polarization-independent response. Whereas the geometry of color pixels in conventional ink-displays is defined by the shape of tiny liquid cells, the metasurface color-pixels can be patterned in arbitrary shapes and offer diffraction-limited resolution. FIG. 1B shows the highly-reflective "on" state of a single, blue pixel and various characters for a channel filled with air (n=1.0) and the low-reflectivity "off" state that results from flowing a liquid with n=1.7. The 25×25 μm² metasurface pixel contains 10,000 Si nanodisks and yet appears optically uniform due to the subwavelength disk spacing. The printed word "Stanford" highlights the sub-micrometer resolution enabled by metasurface "inks". The switching of pixels requires large and broadband changes in reflectivity, as can be seen in our spectral measurements (FIG. 1C).

Figure 1D:
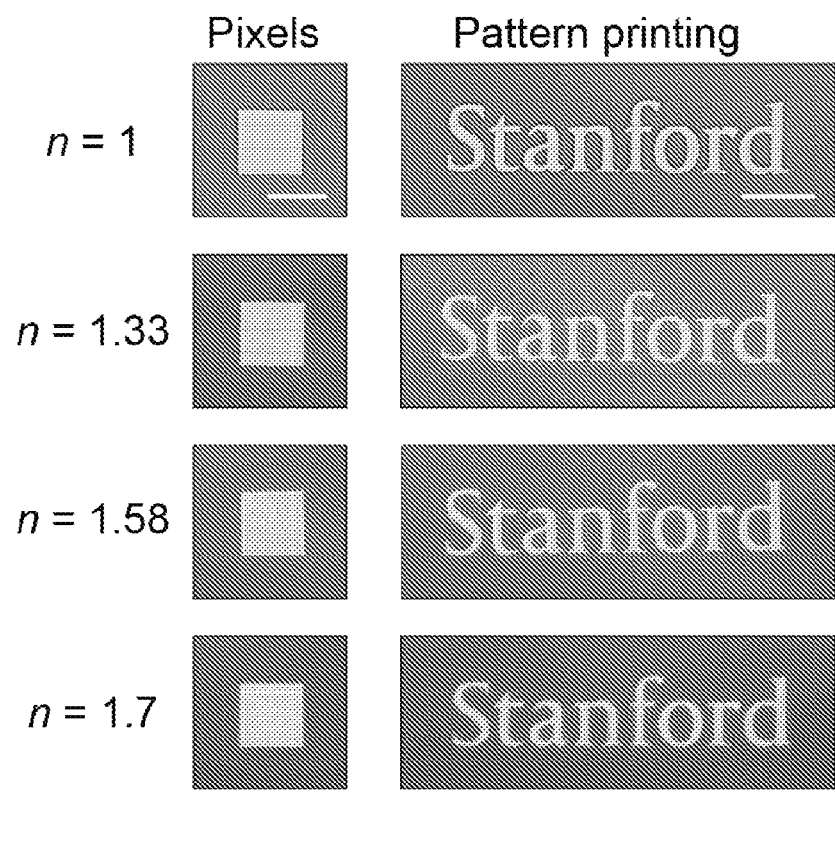
FIGS. 1D-E show results pertaining to color control.
Figure 1E:
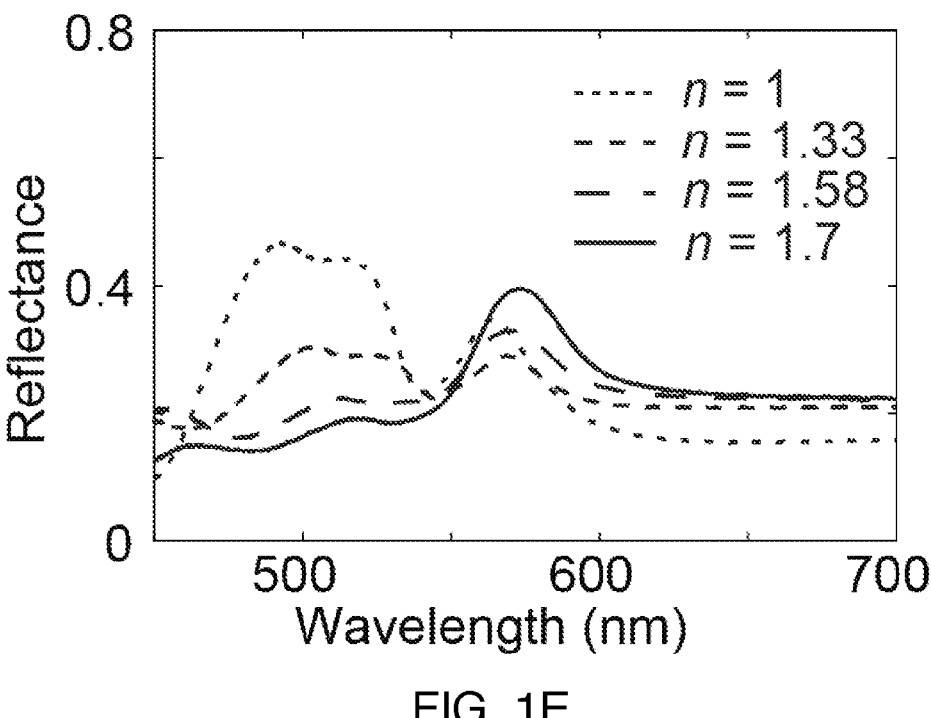

Second, we demonstrate dynamic color tuning of reflective pixels with another metasurface design. FIGS. 1D-E show these results, where FIG. 1D shows reflection optical images, and FIG. 1E shows measured reflection spectra of the metasurfaces. The metasurface parameters for this example are h=75 nm, D=185 nm, and p=280 nm. The scale bar on FIG. 1D is 25 μm. Both in the optical reflection images (FIG. 1D) and the measured reflection spectra (FIG. 1E), we observe gradual tuning of the color across the visible spectrum as the index in the channel increases from 1.0 to 1.7.

Third, we show how we can realize optics-on-demand, where optical elements can be made to appear and disappear. This requires efficient, dynamic control over the diffraction efficiency of phased-array optics. To illustrate the concept, we design and fabricate a geometric phase metasurface composed of rotated rectangular Si nanoblocks that encodes a local geometric phase profile with sub-wavelength resolution. This creates an engineered wave front that generates a desired light-field distribution.

Figure 1F:
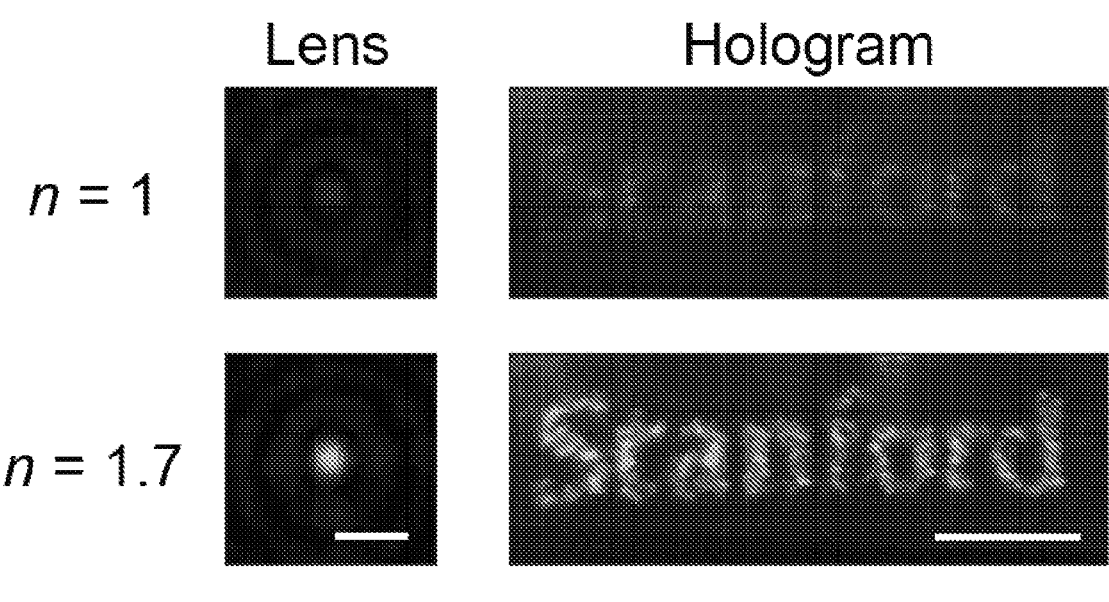
FIGS. 1F-G show results pertaining to diffraction efficiency control.
Figure 1G:
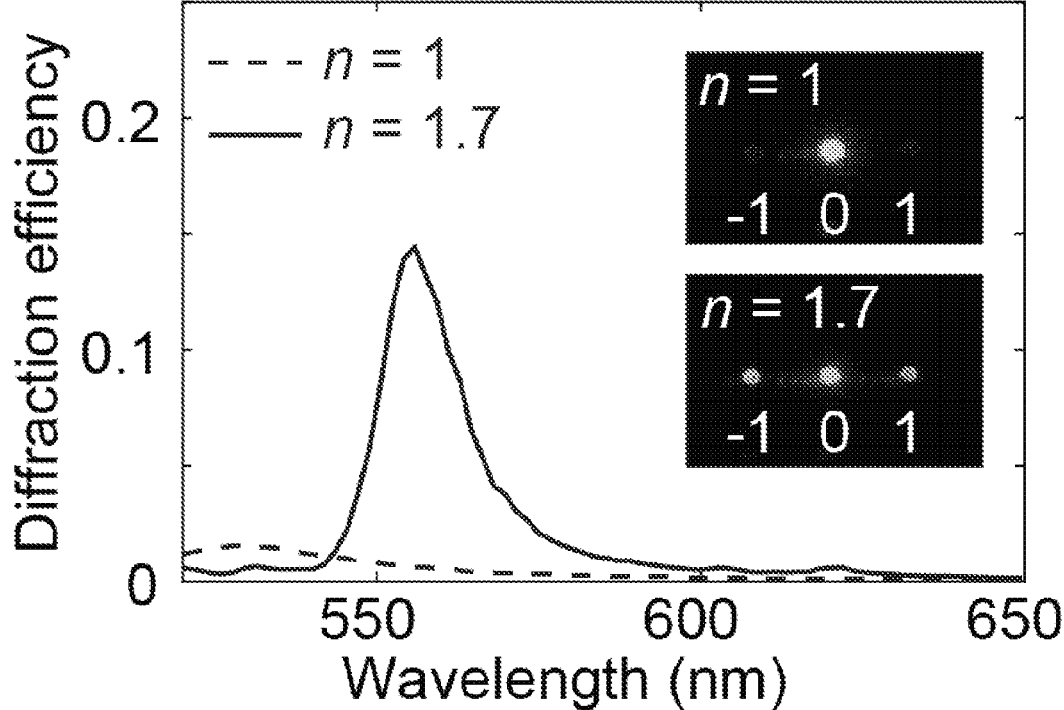

FIGS. 1F-G show these results, where FIG. 1F shows optical images of the back focal plane of a meta-lens (NA=0.45) (left) and far-field distribution of a meta-hologram (right) illustrating the dynamic diffraction efficiency tuning of optics-on-demand. Here the scale bars are 3 μm on the left and 1 mm on the right. FIG. 1G shows measured diffraction efficiency spectra of geometric phase metasurfaces (h=120 nm, length L=120 nm, width W=90 nm, p=320 nm). The insets of FIG. 1G show the Fourier plane of a meta-grating that can effectively steer the beam when turned on.

These metasurfaces can be designed to encode various functions, such as high-NA beam focusing, holography (FIG. 1F), and large-angle beam steering (insets to FIG. 1G). FIG. 1G shows that these optical functions are initially turned off through the entire visible frequency range when n=1.0. They can be gradually turned on as we increase the refractive index of the surrounding medium. We quantitatively measure the increase in intensity from 0.6% to 14.4% of the incident intensity at 555 nm, a 24-fold increase in the diffraction efficiency.

III) Modelling Metasurfaces with Tunable Fictitious Surface Currents

To achieve the above-mentioned functions, we capitalize on the presence and strong dispersion of several optical resonances that are supported by the Si nanodisk arrays in the visible spectral range. Previous research on the Kerker effect has shown that the resonant multipolar excitation of nanostructures can be used to very effectively direct the flow of light. The far-field scattering for each multipole is characterized by a unique angular distribution and phase symmetry. When two or more multipoles are excited simultaneously, strong interference effects can be observed and harnessed to direct the scattered light. This line of thinking has led to the design of Huygens' metasurfaces comprised of many Kerker scatterers. Here, we design highly-tunable metasurfaces by expanding on these notions and applying them to dispersive resonators. Specifically, we engineer the nanostructures to display different spectral shifts and changes in their quality factor when the local index is altered. We show that this ability to dynamically move and shape optical resonances offers a valuable new route to control the flow of light in a spectrally-dependent manner.

Figure 2A:
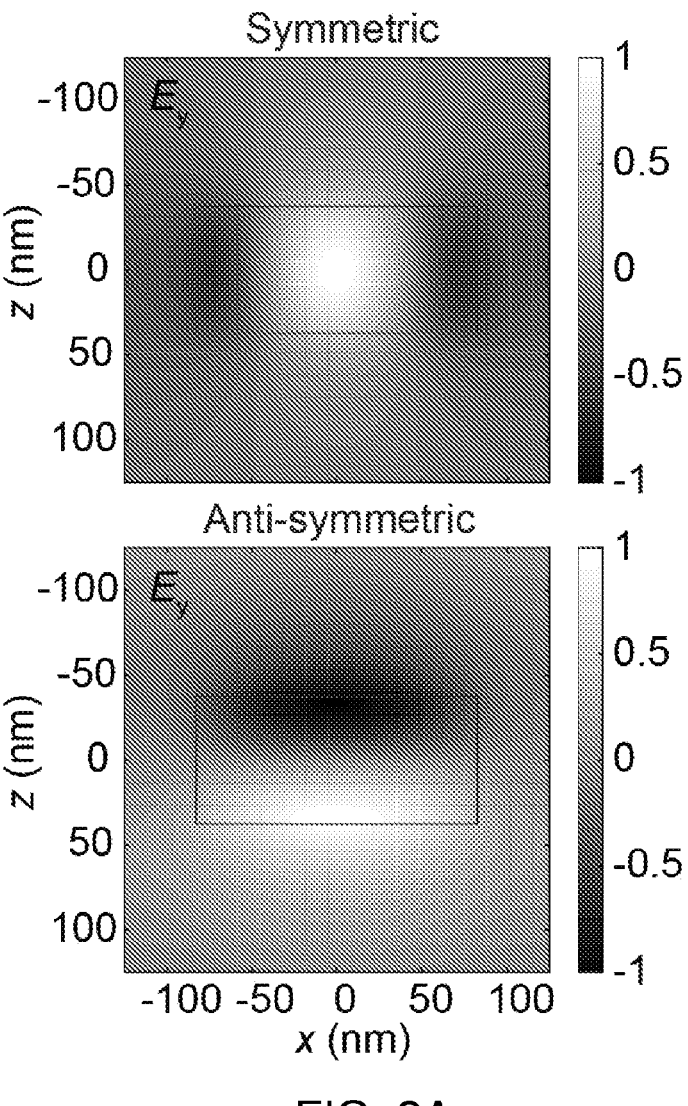
FIG. 2A shoes simulated mode field patterns for a symmetric and antisymmetric mode.

The scattering properties of the metasurface elements can be modeled by fictitious electric ($J_s$) and magnetic surface currents ($M_s$). The magnitude of these currents can be found by summing the contributions from all the excited multipoles with a top-bottom symmetric (for $J_s$) or anti-symmetric (for $M_s$) radiation phase with respect to the metasurface plane. For the disk sizes and geometries considered here, we find two dominant optical resonances in the visible spectral range via a quasi-normal-mode (QNM) analysis. Their electric-field distributions show the required symmetric and anti-symmetric phase symmetries (FIG. 2A). Here FIG. 2A shows electric-field distributions ($E_y$) of two dominant optical resonances in a Si nanodisk array with symmetric and anti-symmetric radiation profiles.

Figure 2B:
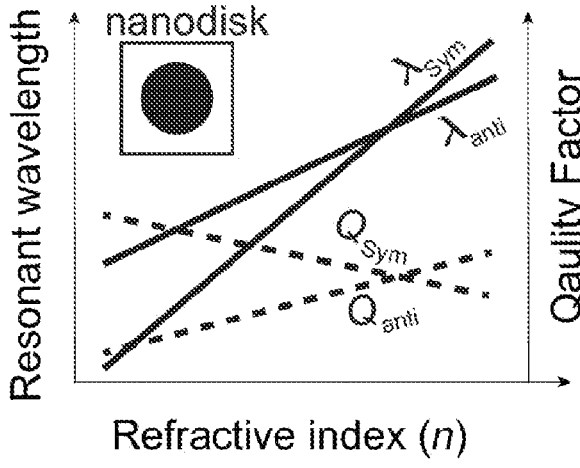
FIG. 2B shows dependence of resonant wavelength and quality factor on ambient index of refraction for the symmetric and antisymmetric modes of FIG. 2A.

With increases in the refractive index of the surrounding medium, the two resonances exhibit notably different spectral shifts and changes in optical quality factor as illustrated in FIG. 2B. Here, FIG. 2B is an illustration of two dominant optical resonances in nanodisks showing different dispersion with the refractive index of surrounding medium. The inset of FIG. 2B is a top view of a unit cell of a nanodisk array supporting two dominant optical resonances.

This can be attributed to the differences in the modal confinement to the nanodisks as well as the optical coupling between neighboring disks. The latter is modified by dielectric screening when the environmental index is altered. We find that compared to the anti-symmetric mode in which the electric field is tightly confined in the nanodisks, the electric field of the symmetric mode has three antinodes inside the disk, and is more extended beyond the disk boundary. This results in a strong overlap of the near fields with the dielectric environment and thereby very effective shifting of the resonance wavelength. Therefore, the symmetric mode exhibits a stronger spectral shift than the anti-symmetric mode. Meanwhile, radiative coupling is dominant for the anti-symmetric mode, which can lead to a boost in the quality-factor when the effective lattice constant approaches the resonant wavelength. As a result, we can achieve broad tuning of the relative spectral positions and bandwidths of the two dominant optical resonances. This implies that at a fixed wavelength, the amplitude and phases of the scattered fields can greatly vary, which can be used to manipulate the reflection, transmission, and absorption properties.

For our metasurface, we find that $J_s$ and $M_s$ have dominant contributions from one symmetric and one anti-symmetric resonance. For this reason, many of the observed spectral features can be understood qualitatively using a temporal coupled mode theory (CMT) for two resonators with Lorentzian spectral lineshapes: one for the symmetric mode and the other for the antisymmetric mode. The model expresses the metasurface reflectivity R in terms of the angular frequency ω of the incident light wave and the refractive index of the surrounding medium n:

$$R(n, \omega) = |r(n, \omega)|^2 \cong \left| a_s(n, \omega)e^{i\varphi_s(n,\omega)} - a_a(n, \omega)e^{i\varphi_a(n,\omega)} \right|^2, \quad (1)$$

where $a_s$ ($a_a$) and $\varphi_s$ ($\varphi_a$) refer to the amplitude and phase of the plane waves emerging from the symmetric (antisymmetric) resonators.

Equation 1 clearly shows how the reflectivity is controlled by the interference of these two plane waves. For this reason, the manipulation of the spectral reflectivity comes down to achieving strong resonances (i.e. large amplitudes) and controlling their relative phases. From CMT we find that these quantities critically depend on the resonance frequency $\omega_s$ ($\omega_a$), the radiative damping $\gamma_{rs}$ ($\gamma_{ra}$), as well as the dissipative damping $\gamma_{ds}$ ($\gamma_{da}$) of the resonators:

$$a_s(n, \omega)e^{i\varphi_s(n,\omega)} = \frac{-\gamma_{rs}(n)}{i(\omega - \omega_s(n)) + \gamma_{rs}(n) + \gamma_{ds}(n)}$$

and the equivalent expression for the antisymmetric mode response. The resonator geometry, size, and spacing can be engineered to modify these resonator properties and elicit the wide variety of effects illustrated in FIGS. 1A-G.

Equation 1 reveals that we can achieve low reflectivities when strong symmetric and anti-symmetric resonances spectrally overlap. It also shows that high reflectivities are expected when these resonances are spectrally displaced such that a large (near-$\pi$) phase shift is obtained between the two resonances. Physically this results in a situation where the currents $J_s$ and $M_s$ radiate in phase in the backwards (i.e. reflection) direction. To realize dynamic reflectivity control, we capitalize on the different modal dispersion to set up a situation where the two strong resonances are spectrally displaced with an environment index n=1.0 and perfectly overlapped for an index n=1.7 (FIG. 2C).

Figure 2C:
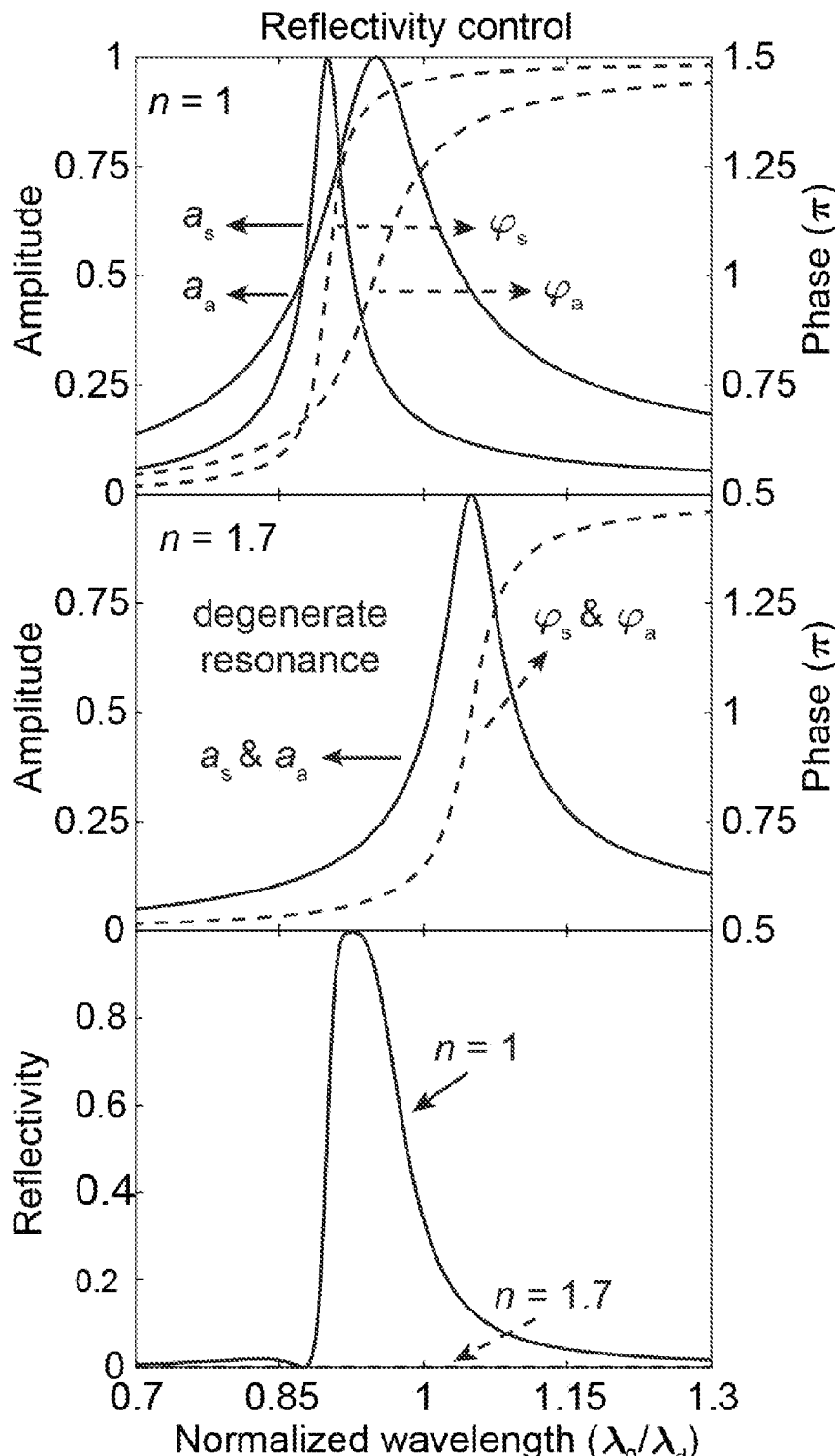
FIG. 2C shows simulation results relating to reflectivity control.

More specifically, FIG. 2C shows an exemplary analysis for dynamic reflectivity control by Si metasurfaces. The top and middle panels show the amplitudes (solid lines) and phases (dashed lines) of the scattered plane waves from the symmetric (s subscript) and anti-symmetric (a subscript) modes as a function of the incident wavelength when the Si metasurface is embedded in different dielectric environment (n=1 (1.7) for top (middle) panel). The bottom panel shows calculated reflection spectra of the metasurface for dynamic reflectivity control.

Figure 2D:
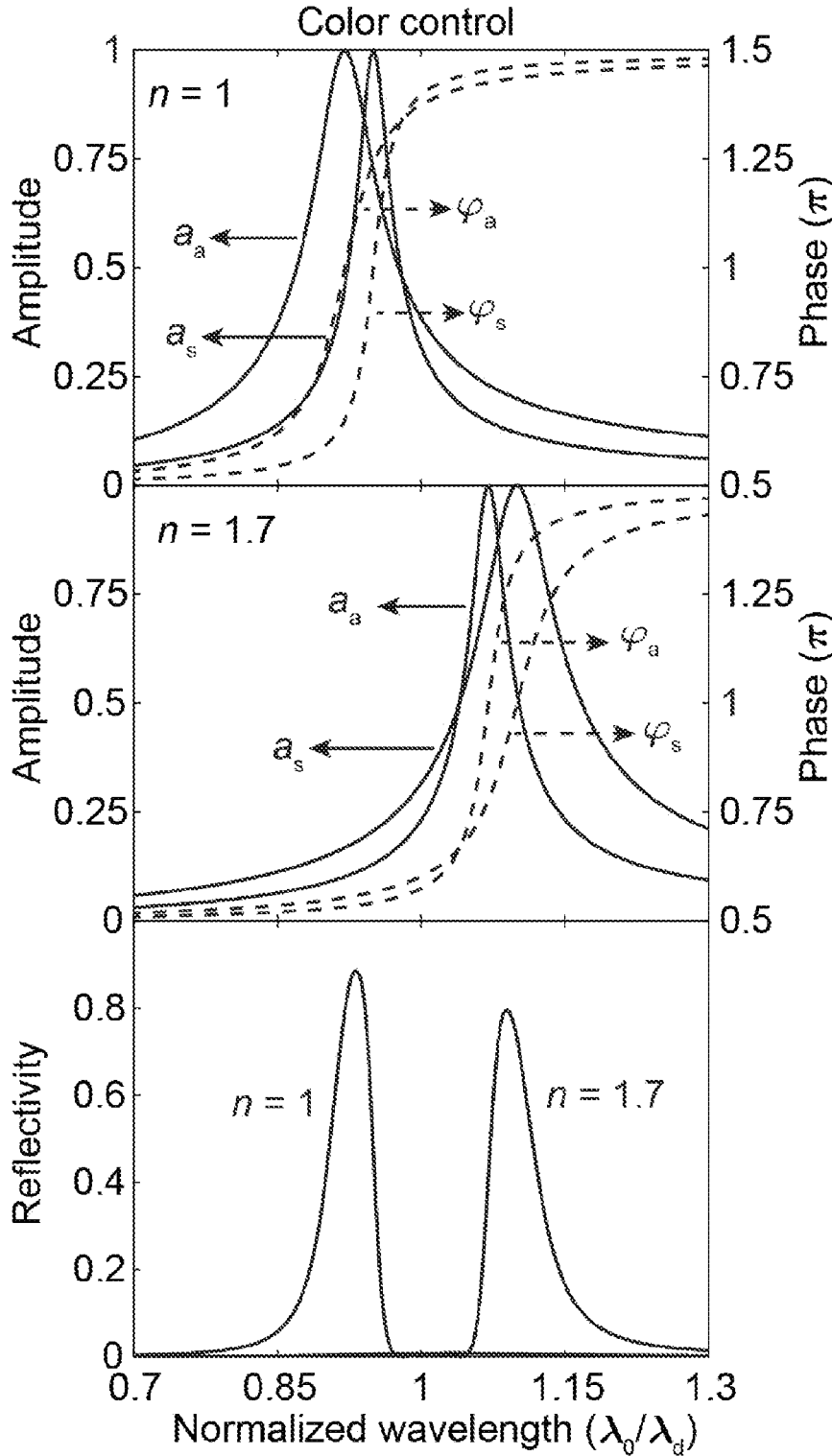
FIG. 2D shows simulation results relating to color control.

We can also achieve dynamic color control in a system with two spectrally-displaced resonances that shift to longer wavelengths together when the index is changed from n=1.0 to 1.7 (FIG. 2D). Here FIG. 2D is a similar analysis to that of FIG. 2C but for dynamic color control. The designed wavelength $\lambda_d$ is set as 550 nm.

Note that in this case, high reflectivities can be achieved for both refractive indices, consistent with the need for reflective displays. QNM simulations are used to identify the realistic metasurface designs that can match the target modal dispersion to achieve a desired function, such as dynamic reflectivity or spectral control.

IV) Achieving Dynamic Control Over On-Demand Optical Elements

The above analysis can also be applied to understand the mechanism of dynamic diffraction efficiency control of geometric phase metasurfaces (FIGS. 1F-G). The main difference is that geometric phase metasurfaces used to achieve this type of control are constructed from anisotropic resonators (e.g., 118 on FIG. 1A). As a result, we need to account for symmetric and antisymmetric resonances that can be excited for polarization directions along the long and short axes of the resonators, resulting in four distinct resonances. The diffraction (polarization conversion) efficiency $\eta$ under circularly-polarized illumination in this case becomes:

$$\eta = \frac{1}{4} |t_x - t_y|^2 \cong \frac{1}{4} \left| a_x e^{i\varphi_x} - a_y e^{i\varphi_y} \right|^2, \quad (2)$$

where $$a_x e^{i\varphi_x} = a_{x,s} e^{i\varphi_{x,s}} + a_{x,a} e^{i\varphi_{x,a}}$$

is the sum of the scattered plane waves from two resonators under x-polarized illumination, and the equivalent equation for y-polarization.

Figure 3A:
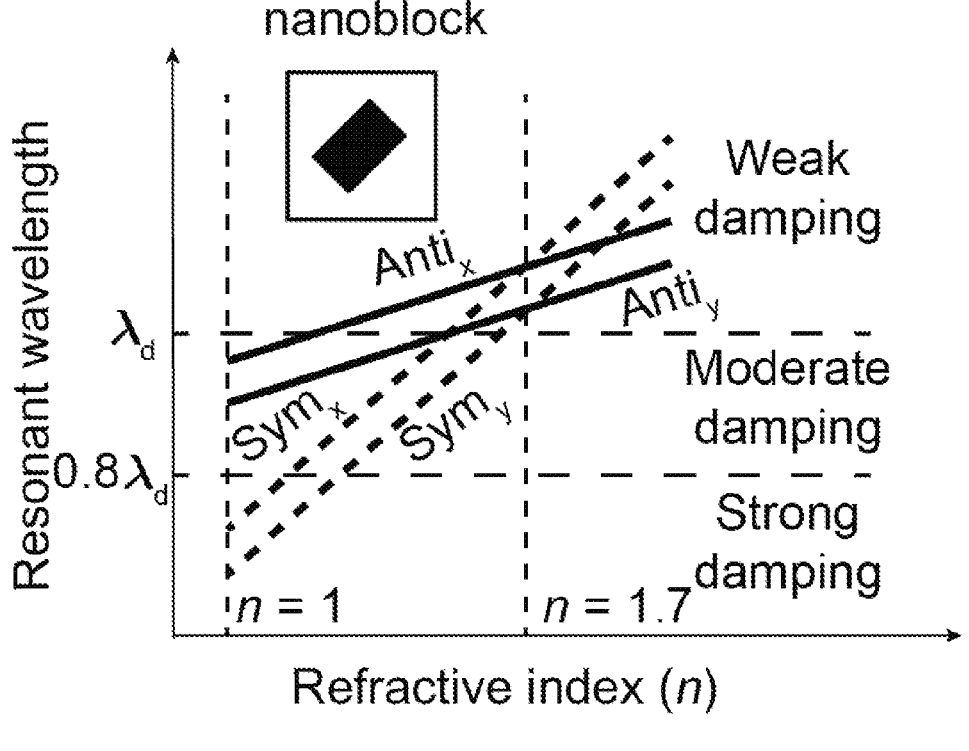
FIG. 3A shows dependence of resonant wavelength on ambient index of refraction for the symmetric and antisymmetric modes in an anisotropic metasurface having polarization dependence.

FIG. 3A illustrates the dispersion of the four resonant modes with the refractive index of the surrounding medium. The inset is top view of a unit cell of a nanoblock array supporting the corresponding four optical resonances. It is important to note that we accurately include the dissipative absorption loss in Si in these simulations. This is particularly important in this example, where the changes in the amplitude and the spectral width play an essential role. For n=1.0, the scattering from the two symmetric resonances can be ignored as they are located in the spectral range where Si shows strong materials absorption ($\lambda < 450$ nm). The two anti-symmetric modes are located at a longer wavelength ($\lambda \sim 520$ nm) and damped moderately. This results in a scattering amplitude that is halved as compared to the lossless case, as seen in the top panel of FIG. 3B. In sharp contrast, all of the four resonant modes experience less material absorption and become degenerate for both polarizations when the index is changed to n=1.7 and the resonances shift to $\lambda \sim 560$ nm. This results in a doubling of the total scattering amplitude as well as a boost of scattering phase difference between two polarizations (middle panel of FIG. 3B). Altogether, this results in a large on/off ratio as derived by Eq. 2 and shown in the bottom panel of FIG. 3B. This analysis corroborates the experimental result shown in FIG. 1G.

Figure 3B:
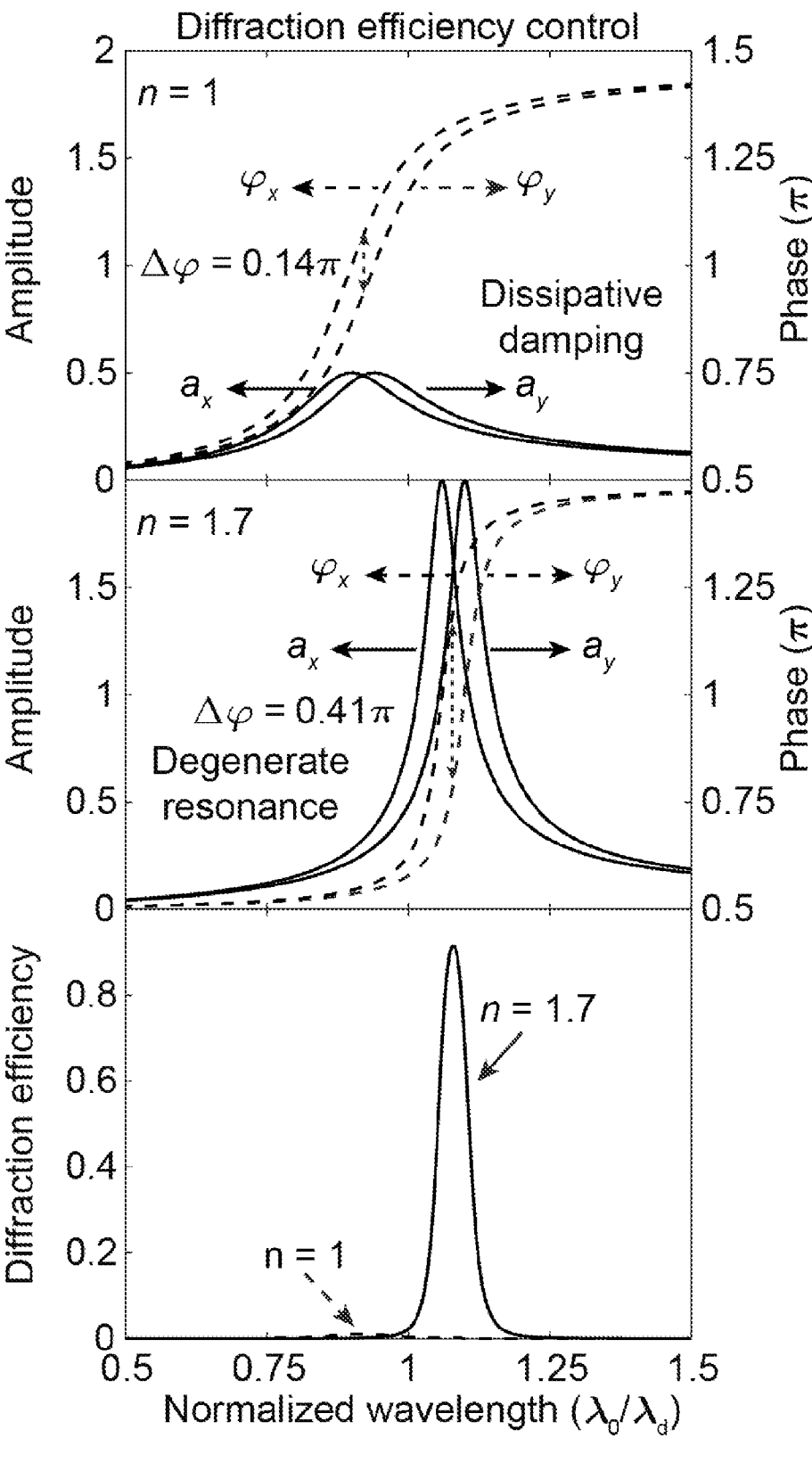
FIG. 3B shows simulation results relating to diffraction efficiency control.

Further details relating to FIG. 3B are as follows. The top and medium panels of FIG. 3B show the amplitude (solid lines) and phase (dashed lines) of the scattered plane waves from two anisotropic resonances for x-(x subscript) and y-polarization (y subscript) as a function of the incident wavelength when the Si metasurface is embedded in different dielectric environment (n=1 (1.7) for top (middle) panel). The bottom panel of FIG. 3B shows calculated diffraction efficiency spectra of the geometric phase metasurface. The designed wavelength $\lambda_d$ is set as 550 nm.

Next, we demonstrate how advanced control of the modal dispersion can be leveraged to spectrally control optical functions by multiplexing two geometric phase metasurfaces composed of differently-sized nanoblock-arrays that resonate at different wavelengths (FIG. 3C). For example, we create a multiplexed meta-lens 302 (NA=0.45) capable of focusing solely red light 304 ($\lambda$=602 nm) or green light 306 ($\lambda$=562 nm) on the same back focal plane, depending on the dielectric environment. More specifically, when n=1, red light 304 is focused as shown by 314, while green light 306 is unaffected. When n=1.7, green light 306 is focused as shown by 316, while red light 304 is unaffected. The scale bar for the SEM image of the as-fabricated meta-lens 302 is 1 μm.

Figure 3D:
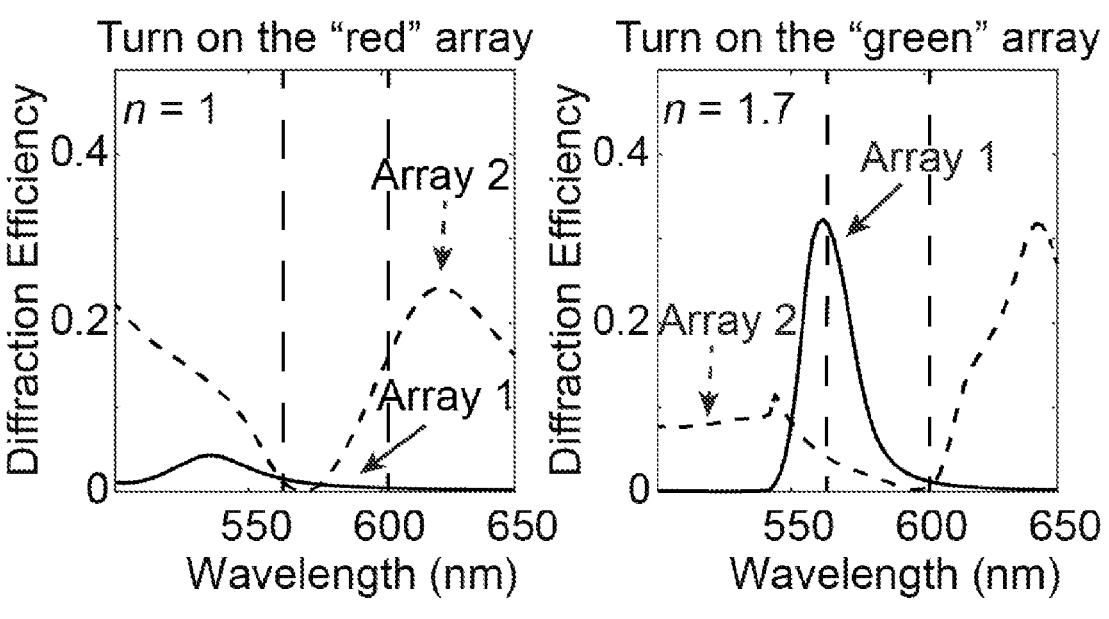
FIG. 3D shows simulation results relating to the example of FIG. 3C.

FIG. 3D shows the simulated diffraction efficiency spectra for two nanoresonators-arrays in two different environments. The modal dispersion of each of the two types of nanoblocks is judiciously engineered in such a way that both of them resonate weakly with either green or red light in the "off" state (i.e., Array 1 on the left and Array 2 on the right); but interact efficiently with one certain color in the "on" state (i.e., Array 2 on the left and Array 1 on the right), driven by optical resonances at the corresponding wavelength.

Figure 3E:
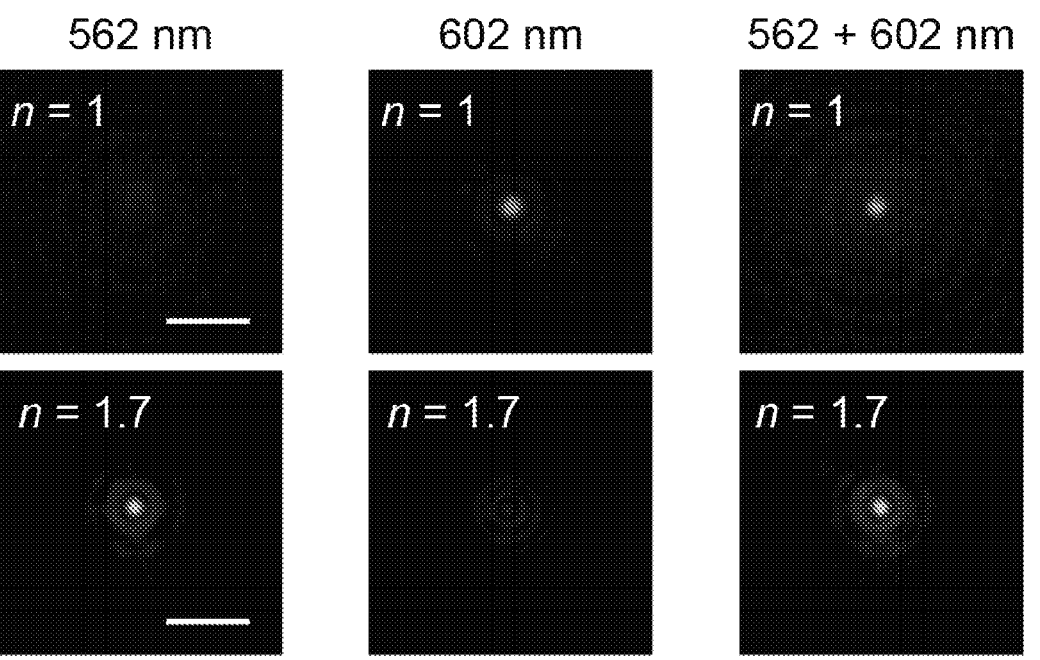
FIG. 3E shows experimental results relating to the example of FIG. 3C.

FIG. 3E shows a series of optical images taken at the back focal plane of the meta-lens with different dielectric environment and illumination conditions, which confirm the validity of the optics-on-demand concept illustrated in FIG. 3C. We note that different phase profiles are applied for the two phased arrays, ensuring achromatic focusing.

V) Integration of Metasurfaces with Microfluidic Systems

To bring the advantages of this versatile platform closer to a practical reality, we integrate our dynamic metasurfaces with a programmable microfluidic cavity system. Such a system provides on-demand control over the refractive index (n=1.0-1.7) of the environment of the nanoresonators by flowing different liquids (or air) in real time. We first integrate a 100 μm-sized geometric phase meta-lens (NA=0.45) with a Y-shaped microfluidic channel (FIG. 4A) to study the modulation dynamics with liquids. High-index oil (n=1.7) and low-index liquid cleaner (HFE-7500, n=1.29) are pumped into the main channel in an alternating fashion, with flow controlled by two pneumatic valves formed by crossing control channels. This enables modulation of the intensity in the focal point by changing the liquid's refractive index.

Figure 4A:
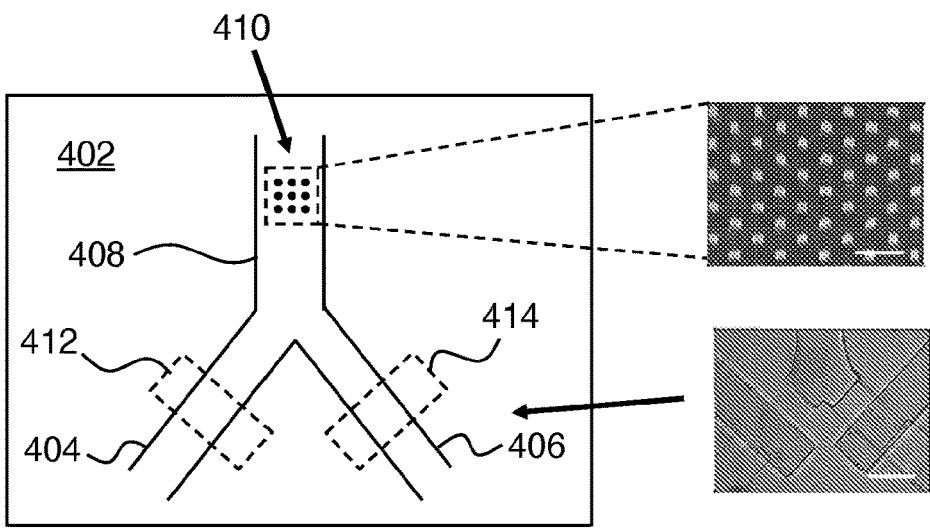
FIG. 4A shows a first example of integration of a metasurface with a fluidic device.

More specifically, FIG. 4A is a schematic of a meta-lens 410 (NA=0.45) integrated with a programmable microfluidic Y-channel disposed on a substrate 402. The top inset is an SEM image of the fabricated meta-lens 410 that was integrated with the microfluidic channels, where the scale bar is 500 nm. The bottom inset is an optical image of the fabricated Y-shaped microfluidic channel, where the scale bar is 100 μm. The Y-channel includes branches 404 and 406 which are controlled by flow valves 412 and 414 respectively, and which flow into common channel 408.

Figure 4B:
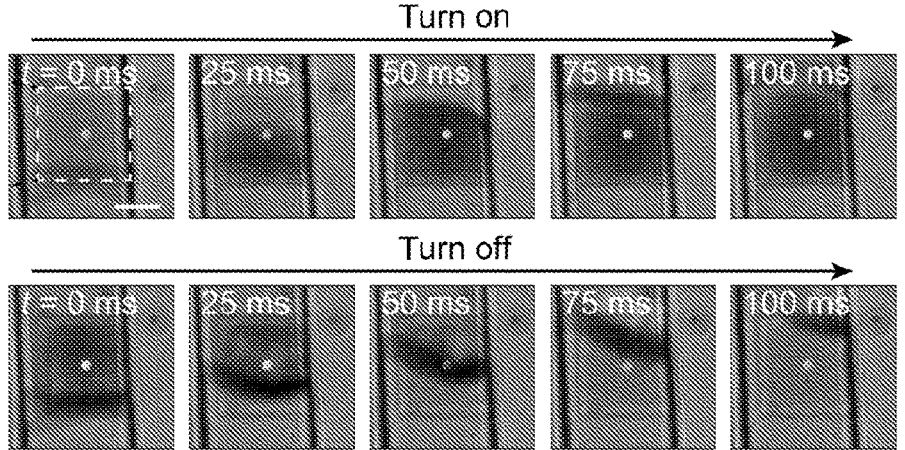
FIGS. 4B-C show experimental results relating to the example of FIG. 4A.
Figure 4C:
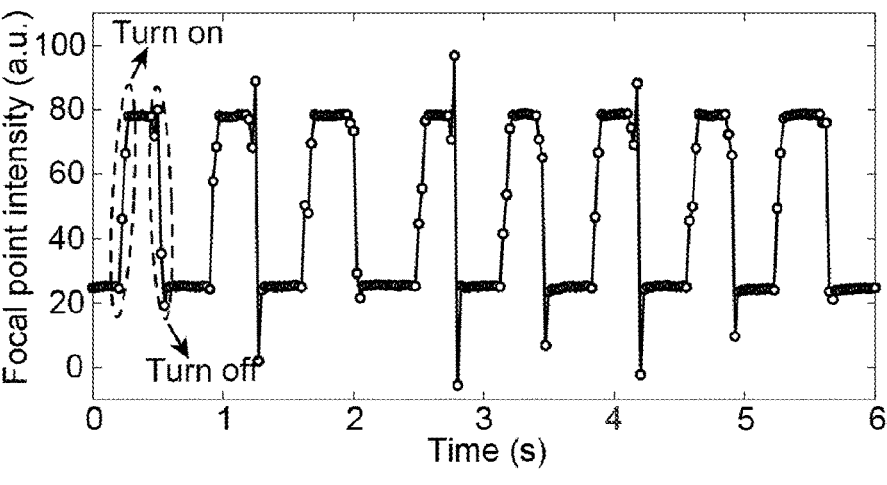
Figure 5A:
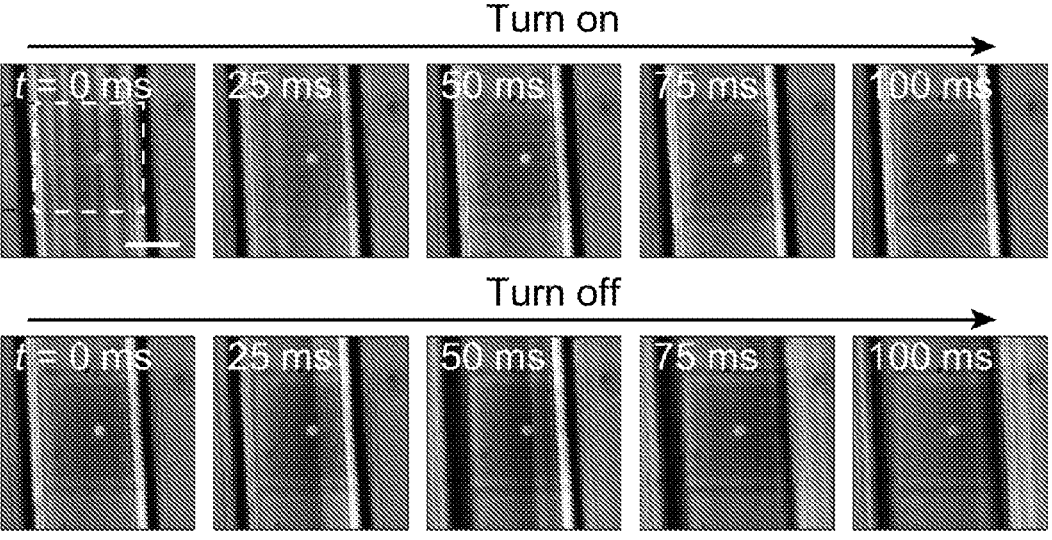
FIGS. 5A-B show further experimental results relating to the example of FIG. 4A.
Figure 5B:
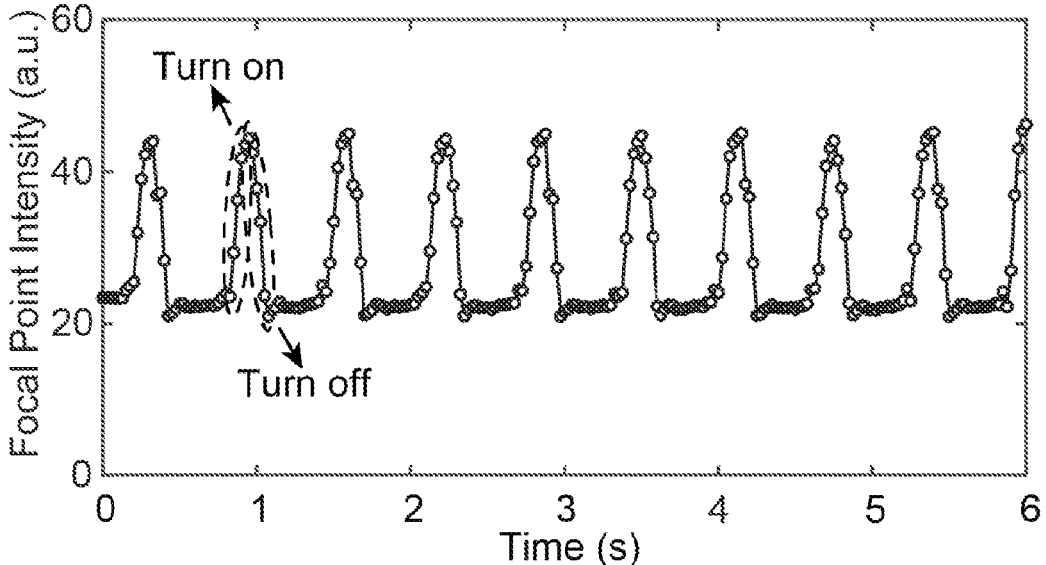
Figure 8A:
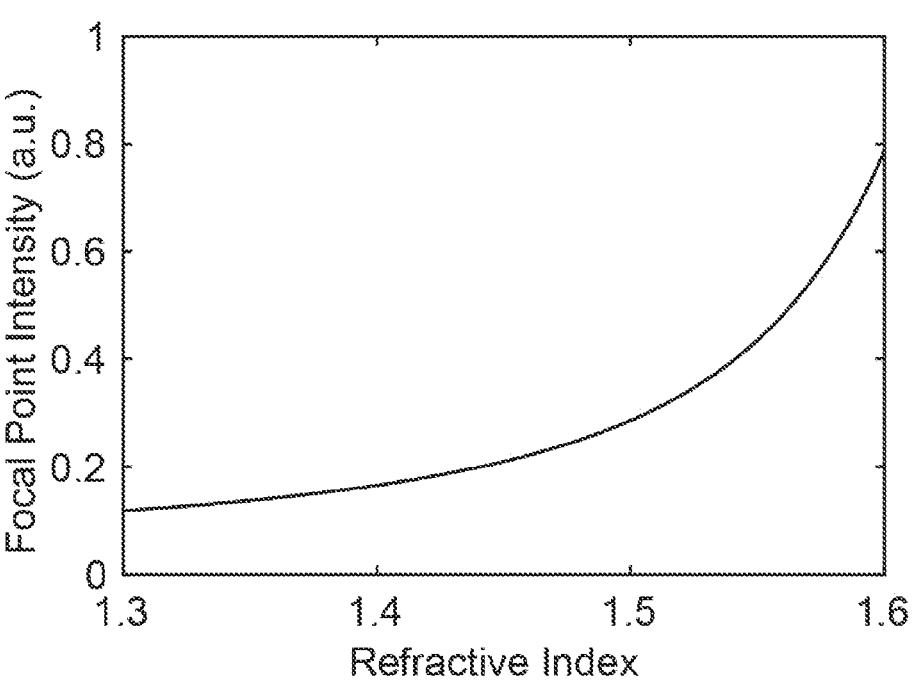
FIGS. 8A-B show simulation results relating to sensing index of refraction.
Figure 8B:
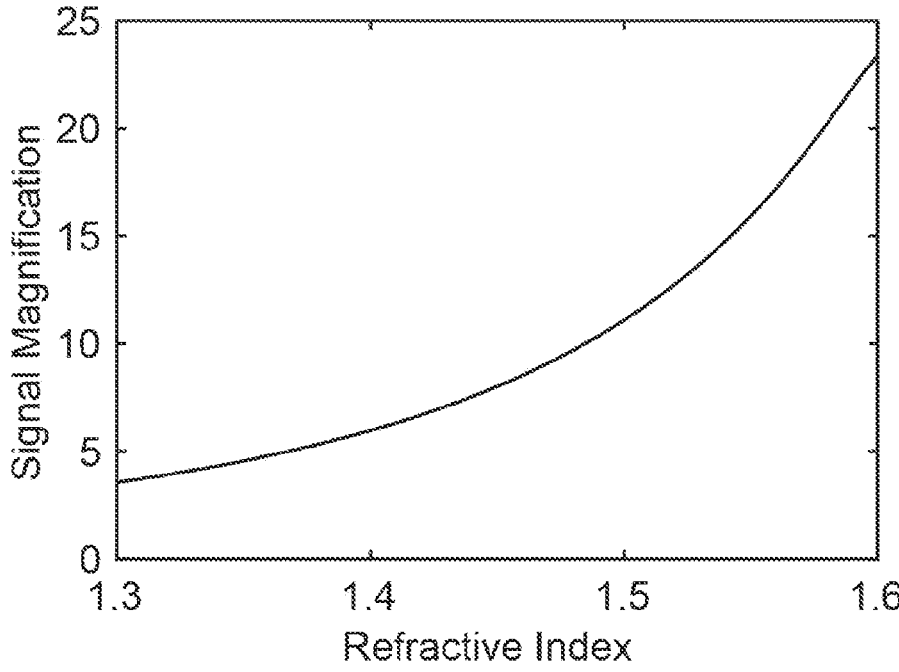

FIG. 4B shows a series of optical images of the focal point while the refractive index flowing over the meta-lens is alternated between high and low to turn on and off the intensity in the focal point, respectively. Here the scale bar is 50 μm. The results show that the intensity modulation can be completed within 100 ms (~10 Hz). Considerable improvements in the modulation speed are expected by optimizing the fabrication process of the microfluidic circuitry (see section VIII-1 below). A hydrophobic surface treatment is also possible to help preventing molecules of different fluids from sticking to the metasurface. A clear liquid phase interface is found in the images, as the two types of liquids used here do not mix. This gives rise to a square-function shaped modulation as shown in FIG. 4C. We note that a sinusoidal-function like modulation is also possible by utilizing low-index cleaner dissolvable in high-index oil (FIGS. 5A-B, section VIII-1). The designed dynamic meta-lens has a bulk refractive-index sensitivity of 37 nm per refractive index unit (RIU$^{-1}$) and a figure of merit of 1.91 RIU$^{-1}$. We note that our design is optimal for image-based spectrometer-less refractive index sensing. The refractive index information is decoded to the intensity of a bright focal spot, which allows low ISO sensing to obtain a larger dynamic range. Considering that the intensity of the focal point is modulated by ~300% with a ~30% refractive index change under an LED-like illumination (FIG. 4C), the dynamic meta-lens shows great potential as an ultra-compact refractive index sensor in real-time chemical/biological sensing (FIGS. 8A-B, described below).

Figure 4D:
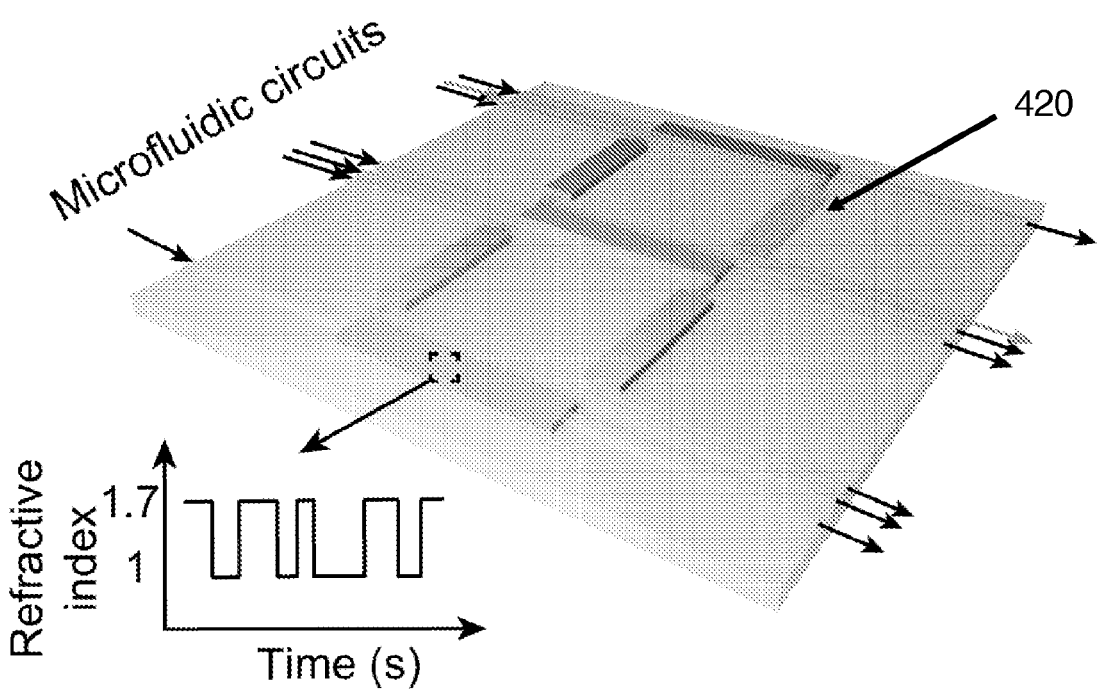
FIG. 4D shows a second example of integration of a metasurface with a fluidic device.

Finally, we demonstrate dynamic, integrated meta-opto-fluidics display functions. By leveraging a mature microfluidics valve technology, we design and fabricate a transparent metasurface digital number display 420 as illustrated in FIG. 4D. The display is composed of seven metasurface bars whose reflectivity can be controlled individually with a set of valves that can deliver either oil or air to the metasurface regions. More specifically, FIG. 4D is a schematic of a transparent metasurface digital number display 420 controlled by programmable microfluidics. The inset of FIG. 4D is an exemplary schematic of real-time refractive index of the material flowing in the channel.

In this integrated system, Polydimethylsiloxane (PDMS) microfluidic circuits are stacked on top of metasurface display elements that are patterned into a Si-on-sapphire wafer. An objective lens underneath the transparent sapphire wafer is used to illuminate and collect the reflected light from the display.

Figure 4E:
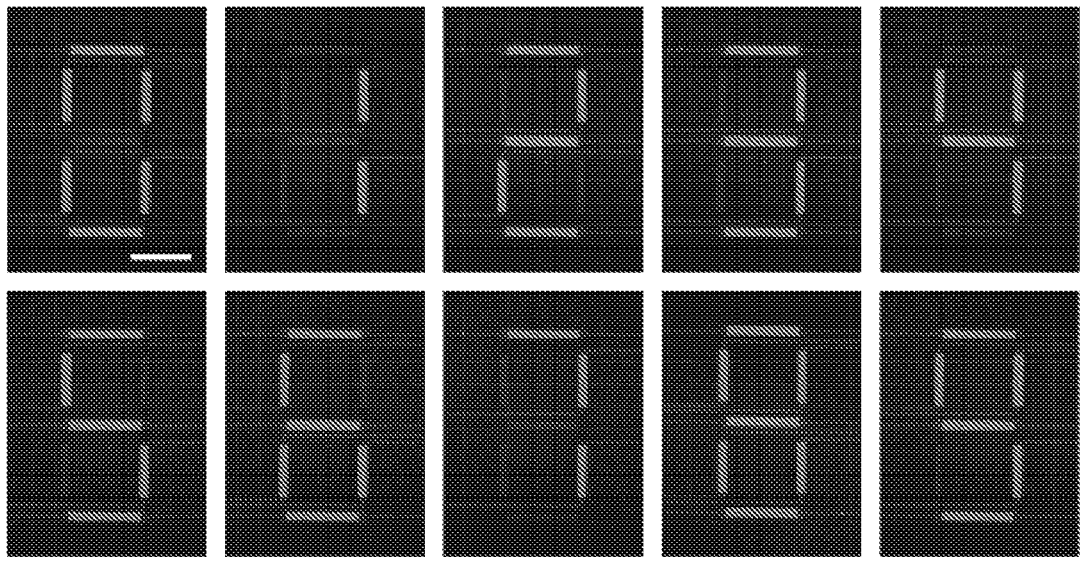
FIG. 4E shows experimental results relating to the example of FIG. 4E.

FIG. 4E shows the reflection images captured from the display, clearly demonstrating all different digital numbers from 0 to 9. The observed contrast ratio largely matches the performance of liquid crystal displays without the use of polarizers, thereby paving a promising new way to the realization of metasurface displays on a transparent substrate. Here the scale bar is 1 mm, the display is illuminated by an unpolarized white light source and a 530 nm short-pass filter is inserted to enhance the contrast.

VI) Conclusions

In conclusion, we have demonstrated a comprehensive dynamic metasurface flat-optics platform that offers dynamic intensity and spectral control of light-fields. The unprecedented high spatial resolution and transparency provide new degrees of freedom in designing multi-functional, integrated, and dynamic flat-optics. The high sensitivity of the scattering that is engineered into the metasurface elements, also opens new sensing modalities by displaying subtle index changes in microfluidic channels. Combined with well-established large-scale microfluidic integration, this platform offers a bright future for dynamic display, imaging, holography, and sensing applications.

VII) Methods

VII-1) Numerical Simulations

We perform 3D finite-element simulations in the frequency domain using the commercial software package COMSOL to study the optical properties of Si metasurfaces embedded in different dielectric environment (refractive index of the surrounding medium n=1.0 to 1.7). In the full-field simulations (FIG. 3D), we apply periodic boundary conditions and use two ports along the light propagation direction to simulate the properties of the Si nanoresonator arrays. In the quasi-normal-mode (QNM) simulations (FIG. 2A), the two ports are replaced by perfect matching layers (PML). We first study the case where Si nanoresonators are suspended in an isotropic dielectric environment without substrate. Different types of silicon (Si) are used in the simulation to match the specific experimental condition (single-crystalline Si for nanodisk array metasurfaces, and poly-Si for geometric phase metasurfaces). The optical constants are retrieved from spectroscopic ellipsometry. We characterize the reflection and transmission of the Si nanoresonator array for a normally incident plane wave. The electric-field distribution inside the Si nanoresonator is extracted as well and used for the multipole decomposition analysis. We also study the impact of the substrate underneath the metasurface. The refractive index of sapphire and fused silica is set as 1.77 and 1.46, respectively.

VII-2) Device Fabrication (1) Si Metasurfaces for Dynamic Reflectivity and Color Control.

We start the fabrication with a 1 cm square 500-nm-thick single-crystalline Si on sapphire substrate (MTI-Corp). Reactive-ion etching (LamPoly) is used to thin down the Si film to 75 nm. 70-nm-thick hydrogen silsesquioxane (HSQ) is then spin coated on the Si film (4% HSQ, 4000 rpm for 40 s) to serve as a negative-tone electron-beam resist layer followed by post-baking at 90° C. for 45 min. A thin conductive polymer layer (E-Spacer 300Z) is then spin coated on the Si film to mitigate charging effects during the electron-beam lithography process (JEOL 6300 100 kV system). The nominal e-beam dose is set to ~2000 $\mu$C cm$^{-2}$ and the development is performed in 25% tetramethylammonium hydroxide (TMAH) for 2 min. Reactive-ion etching is then used again to transfer the HSQ hard mask patterns to the silicon slab, and the remaining HSQ hard mask pattern is removed by immersing the sample in diluted 2% hydrogen fluoride (HF) solution for 1 min.

(2) Geometric Phase Si Metasurfaces for Dynamic Diffraction Efficiency and Spectral Control of Phased-Array Optics.

We choose fused silica as the substrate for the geometric phase metasurfaces, since its isotropic refractive index is preferred over the birefringent sapphire when modulated light transmits through the substrate. We first deposit a 200-nm-thick Poly-Si layer on a fused silica substrate by low-pressure chemical vapor deposition (LPCVD). We note here that, in principle, single-crystalline Si can also be bonded to a borosilicate glass substrate by a more complex, yet robust wafer-bonding process. The optical constants and the thickness of the Poly-Si slab are measured by ellipsometry (J. A. Woollam M2000). The Poly-Si slab is then etched down to 120 nm. The same fabrication process described in (1) is conducted subsequently to pattern the Poly-Si slab into metasurfaces.

(3) Microfluidic Device Fabrication and Operation.

Devices are fabricated in poly(dimethylsiloxane) (PDMS, RTV 615, Momentive Performance Materials, Albany, NY) by multi-layer soft lithography. Each device consists of a two-layer elastomeric structure with a top control layer of channels that act as valves capable of pushing down and pinching off the channels to close them in the underlying liquid flow layer. This flow layer rests on the sample substrate, with the channels for injecting fluids (or air) overlaying the patterned display features.

Planar silicon molds are defined by photolithography, using photomasks designed with CAD software (AutoCAD, Autodesk Inc.) and printed on transparency films at a resolution of 20,000 dots per inch (FineLine Imaging Inc, Colorado Springs, CO). Molds are fabricated on 4-inch test-grade silicon wafers (University Wafer, South Boston, MA). The "control" mold is fabricated using SU8-2025 photoresist (Microchem) to deposit valve channels 24 $\mu$m in height. The "flow" mold is fabricated with three lithographic steps. First, a blank layer of SU-8 2005 is deposited to promote adhesion of subsequent layers. Next, areas that will be pinched-off to restrict flow via pressurization of the control channels are fabricated using 13-$\mu$m high SPR220-7 photoresist (Shipley). These SPR220-7 channels are rounded to facilitate valve closure by incubation at 115° C. for 15 min. A hard bake at 190° C. for 2 h is used to prevent SPR photoresist erosion during addition of subsequent layers. Finally, flow channel features that will not be valved are fabricated using 14-$\mu$m SU8-2015 photoresist (Microchem). All photoresist processing is performed according to manufacturer specifications.

Oil, solvents, and air are injected into the device via tygon tubing and pins (NE Small Tube) by using pressure-driven flow from regulated house air. Valve actuation within the device is accomplished by applying pressure to water within the control channels, which deflects the PDMS membrane and pinches closed the flow channel below. This turning on and off of pressure is controlled by pneumatic solenoid valves (Festo Corp., Hauppauge, NY) driven by an ethernet-based, programmable fieldbus I/O system with digital output modules (750-841 Programmable Fieldbus Controller, 750-504 4-Channel Digital Output Module, Wago Corp., Germantown, WI). An open source custom software platform, allows for real time control and script-driven automation of all aspects of the chip operation.

VII-3) Optical Measurements (1) Sample Dielectric Environment Setup.

A set of refractive index liquids (Cargille Labs, n=1.4 to 1.7) is used to set up the dielectric environment of the sample. A droplet of refractive index liquids is transferred onto the sample by a pipettor and then covered by a microscopy cover glass before optical characterization.

(2) Bright-Field Reflection Measurements.

We perform the optical reflection measurement using a Nikon C2 confocal microscope. Unpolarized light from a halogen lamp is used for top-illumination of the sample through a ×20 objective (Nikon, NA=0.4). The reflection signal is then collected by the same objective and the reflection optical images of the samples are taken by a Nikon DS-Fi1 camera. A confocal scanner with a 60 $\mu$m pinhole is used to spatially select the signal which is analyzed using a SpectraPro 2300i spectrometer (150 lines/mm, blazed at $\lambda$=500 nm) and Pixis Si CCD (−70° C. detector temperature). The reported spectra are averaged by 20 frames (1 s integration time each). All the reflection spectra are normalized by the reflection spectra of a protected silver mirror (Thorlabs, PF10-03-P01).

(3) Meta-Lens Characterization.

We characterize the focal point of the meta-lens using a Nikon C2 confocal microscope. A monochromatic beam (bandwidth ~5 nm) is generated first by an NKT SuperK extreme supercontinuum laser with an acousto-optic tunable filter. The beam is collimated and then circularly polarized using a linear polarizer followed by a quarter-wave plate. The meta-lens is bottom-illuminated and its back focal plane (100 $\mu$m above the sample plane) is then imaged through a ×50 objective (NA=0.6) and captured with a Nikon DS-Fi1 camera.

(4) Meta-Hologram Characterization.

We characterize the far-field distribution of the meta-hologram using a home-built optical setup. The preparation of a collimated, circularly polarized monochromatic beam is described in (3). The sample is mounted on a 3-axis translation stage and illuminated by the monochromatic beam weakly focused with a bulk lens (f=15 cm). A white board placed behind the translation stage is used as a projection screen, and images on the screen are finally captured by a Nikon D750 camera.

(5) Diffraction Efficiency Measurements.

To characterize the optical diffraction properties of the geometric phase metasurfaces, we construct a home-built angle-resolved spectroscopy setup. A broadband beam from the supercontinuum source illuminates the metasurface at normal incidence and we characterize the first-order transmissivity. The metasurface sample and the source are simultaneously rotated with respect to the collection optical path. Since the direction of the diffracted beams depends on the light frequency, we measure the diffracted radiant fluxes at different frequency as we sweep the angle between the source and collection optical path. A 1-mm-wide pinhole (aperture stop) is located at the back focal plane of the collection lens to resolve the frequency component of the diffracted beam.

(6) Modulation with Programmable Microfluidics.

The microfluidic meta-lens is imaged using a custom Nikon Ti microscope with a transilluminator similar as described previously. Light from a Lambda LS Xenon arc lamp (Sutter, Novato, CA) is passed through a band-pass filter (Semrock, center wavelength 565 nm, FWHM=24 nm) before being focused into a liquid light guide (Sutter). The other end of the liquid light guide is mounted above the sample by a custom 3D printed assembly in place of the microscope condenser. Images are acquired with a sCMOS camera (Andor) at 2×2 binning, using a ×20 objective (Nikon, NA=0.45). The number display is imaged using the same Nikon Ti microscope, but using inverted microscopy with ×2 objective (Nikon, NA=0.1). Light is provided by a SOLA light engine (Lumencor) and filtered by standard fluorescence filter cubes (Semrock) mounted in a motorized filter turret. A 530 nm short-pass color filter is inserted to enhance the contrast. The microscope is controlled by MicroManager. Images and videos are captured with a Nikon DS-Fi1 camera.

VIII) Supplemental Information

VIII-1) Modulation of an Active Meta-Lens Using Ethanol as Liquid Cleaner in the Example of FIG. 4A FIG. 5A is a series of optical images at the back focal plane taken with a time gap of 25 ms to show the process of turning on (top row) and off (bottom row) the meta-lens. Scale bar: 50 μm. FIG. 5B shows the modulated intensity of the focal point as a function of time when alternatively flowing either high-index oil (n=1.7) or Ethanol (n=1.36) over the meta-lens.

VIII-2) Further Discussions on the Integration of Metasurfaces with Microfluidics (1) Modulation Speed One of the fundamental questions for the demonstrated dynamic flat-optics platform is the highest achievable modulation rate. For display and phased arrays used in vision-related applications, a frame rate of 60 Hz is considered to be an optimal goal so that users can perceive continuous motion. We have experimentally demonstrated that our home-made device can turn on (off) 100 μm-sized pixels (comparable to pixel size of smart phones) within 100 ms (as shown on FIG. 4C), which corresponds to ~10 frames per second (FPS). Although this frame rate is slightly too low for video displays, it already meets the requirement for a wide range of popular applications provided in wearable devices and augmented reality glasses, such as sweat composition monitoring, blood oxygen/sugar level tracking, time/data display, road map preview, turn by turn navigation, etc.

We should also note that the modulation speed of our prototype device can be improved further by optimizing the fabrication and integration process. For example, the weak physical (instead of strong chemical bonding) bonding between the substrate and the microfluidic cavity currently limits the pressure that can be applied to the device. Also, a hydrophobic surface treatment should accelerate the flow speed on top of the metasurface. Altogether, we believe that the ultimate frame rate of this platform can be improved by several factors and reach the ideal FPS for smooth video applications. Given the fact that the liquid (signal) multiplexing can be conducted before injecting liquid trains into the pixel array, the modulation speed is fundamentally governed by the flow velocity in the microfluidic chamber. For example, for a 100 um-sized pixel, 60 FPS requires a minimum flow velocity of 6 mm/s. Fluid dynamics calculations indicate that for a 100-μm-diameter channel and a pressure gradient of 1 psi/cm, the flow velocity of ethanol can be as high as 180 mm/s. This calculation convinces us that the demonstrated dynamic flat-optics platform here can provide on-demand rapid modulation for all the vision-related applications. We also note that moving the interface between two types of liquids by electrowetting in a microfluidic architecture can also be fast enough to provide the video-speed modulation.

(2) Large-Scale Integration

In order to perform more complex functions for commercial applications, a large-scale (centimeter-scale) design and fabrication of both the metasurface and microfluidic cavities are important. Since the metasurface design for different individual pixels is independent, scaling does not increase the complexity of optical designs. We employ electron-beam lithography to pattern metasurfaces in this project, which may be considered to be time consuming and expensive. However, due to the fact that most pixel arrays are composed of identical/few different types of pixels, it is convenient to apply nanoimprint lithography in mass production. Mature strategies have been developed for the design of large-scale microfluidic integration analogous to the large-scale integrated circuits. The electrowetting technique can also be integrated in the microfluidic cells to operate each pixel independently at video speed. These strategies rely on traditional optical lithography which guarantees its feasibility in mass production.

(3) Potential to Replace the Lens Array in Planar Lightfield Displays

One application of this work relates to planar light-field displays. This technology enables the dynamic intensity control of light-field pixels that can project light to arbitrary directions without the help of microlens arrays. Therefore, such a sub-micrometer-thick light-field pixel array can create different images for different viewing angles, mimicking the light scattered by real three-dimensional objects. By getting rid of microlens arrays, the metasurface light-field display has a more compact configuration, collects and redirects light in a more efficient way, and it also enables the possibility of reflective-type light-field displays.

Figures 6A, 6B:
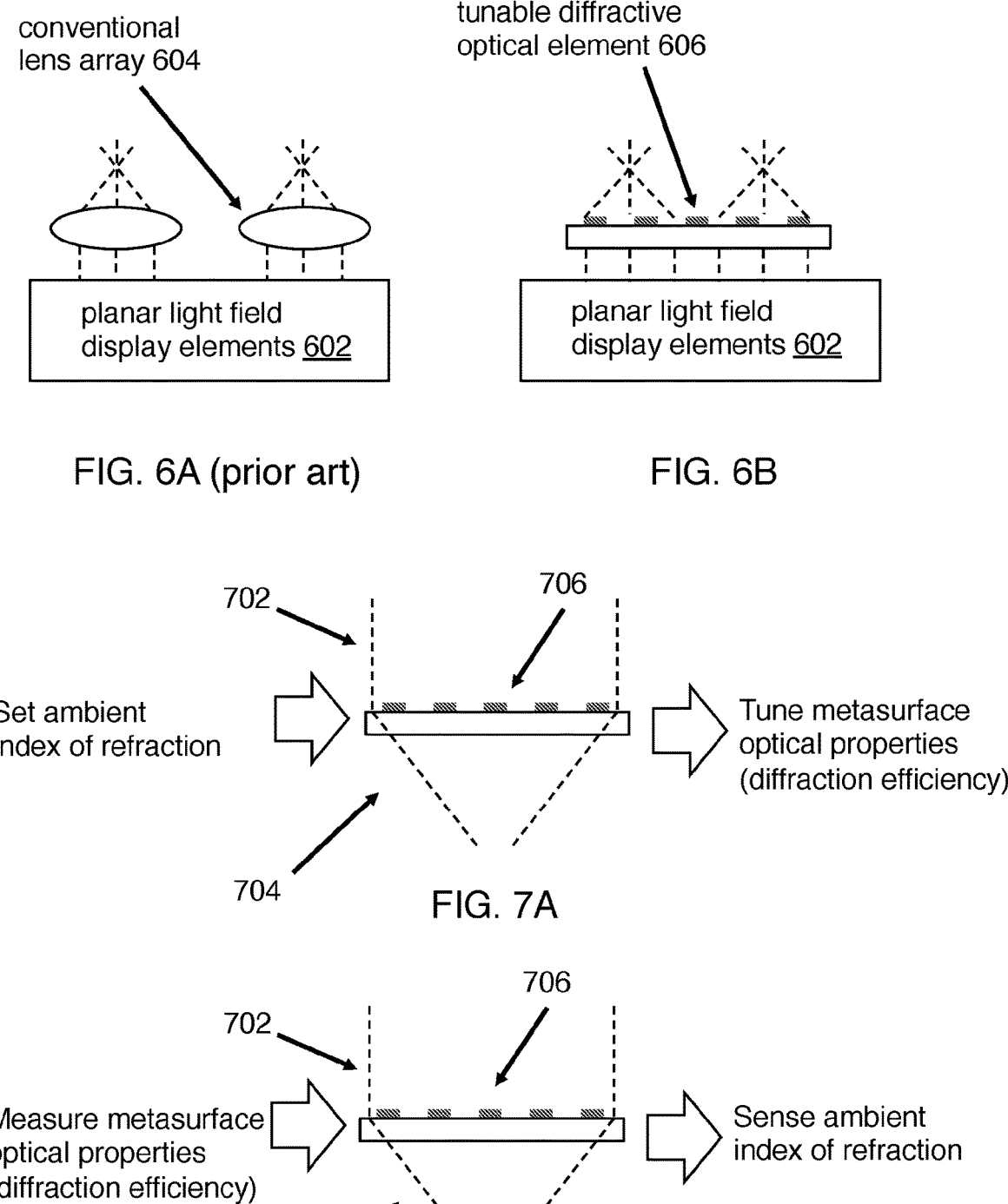
FIGS. 6A-B schematically show replacement of a lens array in a light field display with an optical element according to this work.

FIGS. 6A-B schematically illustrate this concept. FIG. 6A shows a conventional light-field display including display elements 602 and lens array 604. FIG. 6B shows the replacement of the lens array 604 with a tunable diffractive optical element 606 as described herein.

Light-field pixels can be realized by utilizing diffractive effects to project light into different directions, and the intensity of the pixels is controlled by its diffraction efficiency. Further comments on this application follow.

The initial attempt to realize stereo displays starts over 100 years ago. Since then, several effective designs have been developed and they dominate the market currently. These technologies can be divided into two groups: the glasses-bound stereoscopy and the unencumbered (naked-eye) light-field displays.

The glasses-bound stereoscopy is based on the binocular vision effect, in which precise depth perception can be enabled by creating different images seen by two eyes. This can be realized by either using two individual near-eye displays or multiplexing the information (e.g., using polarizers) from a single display. The later method is now widely utilized in the production of 3D movies. The downside of this technology is that, a pair of special glasses is always necessary and it limits the integration of stereo displays with real world.

Naked-eye light-field displays mimic the light scattering from a real three-dimensional object, and generate different images for different viewing angles. Therefore, no additional eyewear is needed and it opens up new opportunities in human-machine interaction in futures daily life. Here, we focus on the revolution of parallax-based light-field displays (2D display with light-directing elements). There are also other ways to create light-field displays, but they either require a much larger space (volumetric displays, Voxon Photonics), or suffer from fundamental difficulties in hardware realization at this moment (holographic displays, which require pixels smaller than a wavelength of light with adjustable phase and brightness).

The current parallax-based light-field displays have a microlens array integrated on top of conventional LCD or OLED displays (FOVI3D Inc.). Each microlens corresponds to a super-pixel composed of a sub-pixel array underneath it, and the light emitted from sub-pixels at different positions are redirected into different directions by the microlens. However, the use of microlens limits the efficiency of the display, as display pixels are usually good Lambertian light sources and only a small part of emitted light can be collected and redirected by the above microlens. The microlens array also creates a rugged top surface which can cause an unpleasant glazing effect when the ambient light gets reflected from it.

By replacing the microlens array with dynamic flat optics, we create a more compact configuration by combining the brightness modulation and light redirection together. The efficiency of the light-field display can be improved, as all the incident light can be modulated and redirected if necessary. The undesirable glazing effect from the microlens array is also avoided. Furthermore, removing the top microlens array also opens up opportunities in realizing reflective-type light-field displays, since the metasurface flat optics can work in both transmission and reflection mode.

(4) Potential Chemical and Bio-Sensing Capabilities.

In this work, we primarily focus on the dynamic control of optical elements by microfluidics. Considering that the efficient active tuning results from the very sensitive optical response of metasurfaces to changes in the dielectric environment, we envision that the metasurfaces can also function as a sensor to characterize the liquids flowing in a microfluidic channel. For example, FIG. 4C shows that the intensity of the focal point of the active meta-lens can be used to determine the refractive index of the liquids. Compared to the previous metamaterial-based refractive index sensors that rely on spectral analysis, our dynamic meta-lens facilitates the detection process by transforming the refractive index information to the intensity of a bright focal spot.

FIGS. 7A-B schematically show the concept. FIG. 7A shows the configurations that have been considered in the previous examples, where metasurface 706 has an effect on incident light 702 determined by the ambient index or refraction (for example, output light 704 can be focused). Briefly, the ambient index of refraction is set to alter or tune metasurface properties, such as diffraction efficiency. FIG. 7B schematically shows the corresponding sensor concept, where metasurface properties (e.g., diffraction efficiency) can be measured in order to sense the ambient index of refraction. More specifically, output light 704 is measured and a model of the metasurface behavior (as a function of ambient index of refraction) is used to relate these measurements to the index of refraction. As indicated above, such measurements can be as simple as measuring the intensity of a focused beam spot.

FIG. 8A shows simulated focal point intensity as a function of the refractive index of liquids covering an exemplary meta-lens (h=110 nm, L=120 nm, W=90 nm, p=320 nm). The wavelength of the incident light is set as 550 nm. FIG. 8B shows simulated signal magnification (defined as the ratio between the focal point intensity variation and the refractive index variation $$M = \frac{\Delta I/I}{\Delta n/n} )$$

as a function of the refractive index of liquids covering the meta-lens. Thus FIGS. 8A-B show that the meta-lens magnifies the refractive index variation by ~10 times.

The bright focal spot allows the use of low ISO sensitivity in the detection process, which improves the dynamic range (the signal to noise ratio) of the sensor. If we assume that a detector can recognize 0.1% light intensity difference (this requires a dynamic range above 10, which is achievable by today's commercial CMOS sensors), the minimum detectable refractive index variation is ~0.01%. Such a high sensitivity should pave the way towards a wide range of chemical and bio-sensing applications.

The invention claimed is:

1. A tunable transmissive optical element comprising:
a transparent substrate;
a resonant metasurface including at least one diffractive optical element configured to operate in a transmissive mode, wherein the resonant metasurface is disposed on the transparent substrate;
a fluidic circuit configured to provide a tunable index of refraction in proximity to the resonant metasurface;
wherein one or more metasurface resonances of the resonant metasurface are altered by changes in the tunable index of refraction to alter one or more properties of the diffractive optical element;
whereby the at least one diffractive optical element has a tunable diffraction efficiency.

2. The tunable transmissive optical element of claim 1, wherein the at least one diffractive optical element can be tuned to appear or disappear.

3. The tunable transmissive optical element of claim 1, wherein the at least one diffractive optical element is selected from the group consisting of: lenses, beam steerers, and holographic elements.

4. The tunable transmissive optical element of claim 1, wherein the metasurface resonances include at least a symmetric-mode resonance and an antisymmetric-mode resonance.

5. The tunable transmissive optical element of claim 1, wherein metasurface features of the resonant metasurface are laterally anisotropic.

6. A planar light-field display including the tunable transmissive optical element of claim 1, wherein the planar light-field display is configured to provide per-pixel intensity modulation and/or light redirection.

7. The planar light-field display of claim 6, wherein the planar light-field display is configured to provide different images for different viewing angles.

8. The planar light-field display of claim 6, wherein the tunable transmissive optical element is configured to replace a lens array.

9. The planar light-field display of claim 6, wherein the planar light-field display is configured to be switchable between a light-field display mode and a conventional display mode.

10. A sensor comprising:

a transparent substrate;

a resonant metasurface including at least one diffractive optical element configured to operate in a transmissive mode, wherein the resonant metasurface is disposed on the transparent substrate;

a fluidic circuit configured to provide flow of a fluid analyte in proximity to the resonant metasurface;

wherein one or more metasurface resonances of the resonant metasurface are altered by changes in an index of refraction of the fluid analyte to alter a diffraction efficiency of the diffractive optical element;

whereby a sensor for the index of refraction of the fluid analyte is provided.

11. The sensor of claim 10, wherein the metasurface resonances include at least a symmetric-mode resonance and an antisymmetric-mode resonance.

12. The sensor of claim 10, wherein metasurface features of the resonant metasurface are laterally anisotropic.

13. A micro-refractometer including the sensor of claim 10, whereby the index of refraction of the fluid analyte can be sensed without relating refractive index to beam angle.

\* \* \* \* \*